(12) United States Patent
Spencer et al.

(10) Patent No.: US 11,007,436 B2
(45) Date of Patent: May 18, 2021

(54) VIDEO RECORDING AND PLAYBACK SYSTEMS AND METHODS

(71) Applicant: Sony Interactive Entertainment Inc., Tokyo (JP)

(72) Inventors: Hugh Alexander Dinsdale Spencer, Solihull (GB); Andrew Swann, London (GB); Simon Andrew St John Brislin, London (GB); Nicholas Anthony Edward Ryan, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 79 days.

(21) Appl. No.: 16/268,882

(22) Filed: Feb. 6, 2019

(65) Prior Publication Data

US 2019/0392221 A1    Dec. 26, 2019

(30) Foreign Application Priority Data

Jun. 21, 2018    (GB) .................................... 1810195

(51) Int. Cl.
*G06K 9/00*    (2006.01)
*A63F 13/5258*    (2014.01)
(Continued)

(52) U.S. Cl.
CPC ........ *A63F 13/5258* (2014.09); *A63F 13/497* (2014.09); *A63F 13/525* (2014.09);
(Continued)

(58) Field of Classification Search
CPC .......... G06K 9/00744; G06K 9/00797; G06K 9/00196; G06K 9/00718; G06T 7/543;
(Continued)

(56) References Cited

U.S. PATENT DOCUMENTS 6,010,403 A * 1/2000 Adam ..................... A63F 13/08
463/6
6,152,821 A * 11/2000 Nakagawa .............. A63F 13/10
463/4

(Continued)

FOREIGN PATENT DOCUMENTS

EP           2023294 A2    2/2009
WO      2017066029 A1    4/2017

OTHER PUBLICATIONS

Extended Search Report for corresponding EP Application No. 18215684, 9 pages, search completed Jun. 13, 2019.

(Continued)

*Primary Examiner* — Amir Alavi
(74) *Attorney, Agent, or Firm* — Matthew B. Dernier, Esq.

(57) ABSTRACT

A method of detecting significant footage for recording from a videogame includes obtaining position information for a target object within a virtual environment of the videogame, obtaining depth buffer information for a current position of a virtual camera used to generate a current image of the virtual environment for display by the videogame, calculating a first distance along a line between the current position of the virtual camera and the obtained position of the target object, detecting whether a depth buffer value along the line corresponds to at least a threshold distance from the virtual (Continued)

camera, the threshold distance being based upon the calculated first distance, and if so, associating the current image with an indicator that the image is significant for the purposes of recording footage from the videogame.

14 Claims, 17 Drawing Sheets

(51) Int. Cl.
  *A63F 13/86* (2014.01)
  *G11B 20/10* (2006.01)
  *A63F 13/497* (2014.01)
  *A63F 13/525* (2014.01)
  *G06T 7/543* (2017.01)
  *G06T 7/73* (2017.01)
  *A63F 13/5378* (2014.01)

(52) U.S. Cl.
  CPC .......... *A63F 13/5378* (2014.09); *A63F 13/86* (2014.09); *G06K 9/00718* (2013.01); *G06K 9/00744* (2013.01); *G06T 7/543* (2017.01); *G06T 7/75* (2017.01); *G11B 20/10527* (2013.01); *A63F 2300/203* (2013.01); *G06K 2009/00738* (2013.01); *G11B 2020/1062* (2013.01); *G11B 2020/10592* (2013.01)

(58) Field of Classification Search
  CPC .......... G06T 7/75; G06T 7/0075; G06T 7/20; G06T 7/2033; G06T 7/2053; G06T 2207/10012; G06T 2207/10016; H04N 5/145; H04N 13/0239; A63F 13/525
  See application file for complete search history.

(56) References Cited

U.S. PATENT DOCUMENTS

| | | | |
|---|---|---|---|
| 7,513,829 B2 * | 4/2009 | Hayashida | A63F 13/005 463/30 |
| 8,574,071 B2 * | 11/2013 | Ichiyanagi | A63F 13/803 463/31 |
| 8,913,664 B2 * | 12/2014 | Lee | H04N 19/51 375/240.16 |
| 9,165,421 B2 * | 10/2015 | Lyons | G07F 17/3241 |
| 9,616,333 B1 * | 4/2017 | Yu | A63F 13/67 |
| 10,335,690 B2 * | 7/2019 | Schleicher | A63F 13/67 |
| 2005/0237323 A1 | 10/2005 | Shimamura | |
| 2009/0208181 A1 | 8/2009 | Cottrell | |
| 2014/0045592 A1 | 2/2014 | Ho | |
| 2015/0217196 A1 | 8/2015 | McCarthy | |
| 2019/0262725 A1 * | 8/2019 | Ryan | G11B 20/10527 |
| 2019/0262726 A1 * | 8/2019 | Spencer | G06T 7/543 |
| 2019/0392221 A1 * | 12/2019 | Spencer | G06T 7/75 |

OTHER PUBLICATIONS

Wei-Ta Chu et al: "Event Detection and Highlight Detection of Broadcasted Game Videos" Computational Models of Social Interactions: Human-Computer-Media Communication. ACM., pp. 1-8, Oct. 30, 2015.
Combined Search Report and Examination Report for corresponding EP Application No. 1810195.6, 4 pages, dated Aug. 17, 2018.

* cited by examiner

39m

VIDEO RECORDING AND PLAYBACK SYSTEMS AND METHODS

BACKGROUND OF THE INVENTION

Field of the Invention

The present invention relates to video recording and playback systems and methods.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Players of videogames often want assistance, either to progress within a game if they are stuck or want to discover additional features; or to refine their existing play, for example to beat a personal best score.

Video captures of in-game footage together with commentary by the creator of the video (for example walk-throughs and speed-runs on YouTube®) are popular as guides or entertainment, but rely on the commentator to provide the desired information and/or to illustrate or demonstrate a particular action wanted by the viewer. Whether the relevant information will be provided to the satisfaction of the viewer cannot easily be predicted for a given video, leading to frustration when watching a video does not reveal the desired answers. Furthermore, for younger viewers, there may be issues with watching videos where the commentator may swear or otherwise act inappropriately. As a result, the benefit of such videos to a viewer wanting assistance for a videogame can be highly variable.

Furthermore a user may have difficulty finding relevant footage, whether this is for assistance or entertainment, or may find that a large proportion of the footage they watch comprises another user exploring, making mistakes, hiding or engaging in other activities that are not directly relevant to the user's interests, or which are not inherently entertaining to watch.

The present invention seeks to address or mitigate this issue.

SUMMARY OF THE INVENTION

In a first aspect, a method of detecting significant footage for recording from a videogame is disclosed and described herein.

In another aspect, a method of selective playback is disclosed and described herein.

In another aspect, an entertainment device adapted to detect significant footage for recording from a videogame is disclosed and described herein.

In another aspect, an entertainment device adapted to selectively playback footage recorded from a videogame is disclosed and described herein.

Further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Video recording and playback systems and methods are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
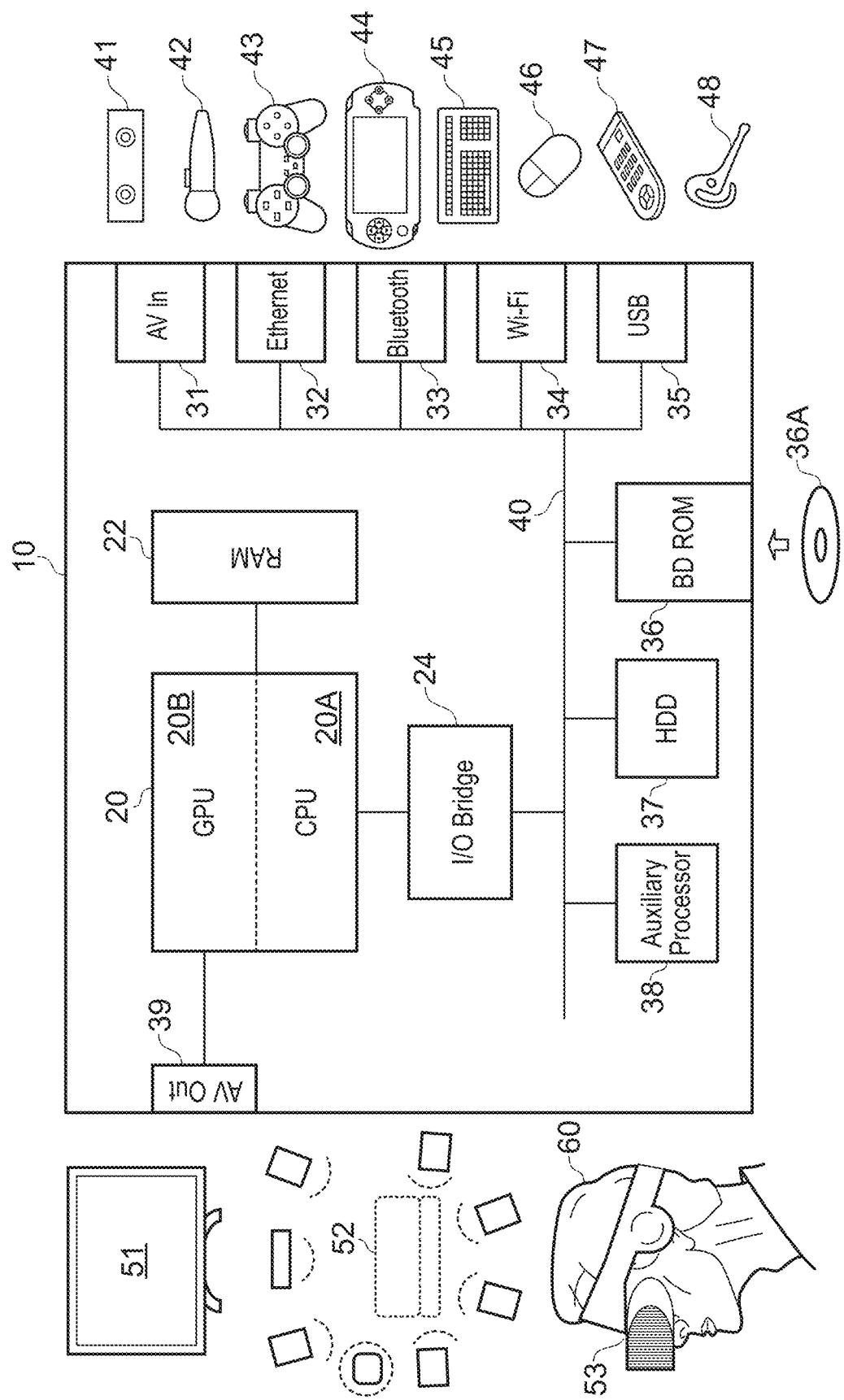
FIG. 1 is a schematic diagram of an entertainment device operable as one or more of the video recording apparatus, video playback apparatus and event analyser in accordance with embodiments of the present invention.

Referring now to the drawings, wherein like reference numerals designate identical or corresponding parts throughout the several views, FIG. 1 schematically illustrates the overall system architecture of a Sony PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4 ®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

Figure 2:
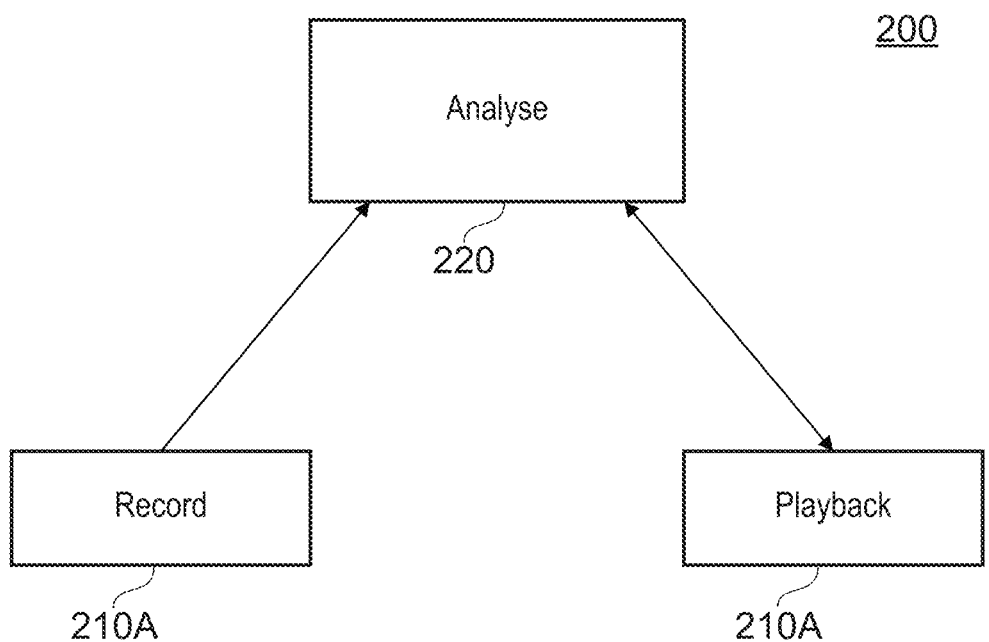
FIG. 2 is a schematic diagram of a system comprising a video recording apparatus, video playback apparatus and event analyser in accordance with embodiments of the present invention.

Referring now also to FIG. 2, the above described entertainment device 10 may operate, under suitable software instruction, as a video recording apparatus (210A) and/or a video playback apparatus (210B) in accordance with an embodiment of the present invention. Optionally the entertainment device may also operate as an event analyser 220, either separately from the recording/playback roles or integrated with the recording role. In other implementations, the event analyser may be a remote server, and/or the video playback apparatus may be a different form of device to the entertainment device 10, such as a mobile phone or tablet, a PC, smart TV, set-top box or different variety of videogame console.

Where the apparatuses are separate devices, they may communicate via the internet (for example using Ethernet® or Wifi® ports 32, 34 as appropriate, or using cellular mobile data).

Figure 3:
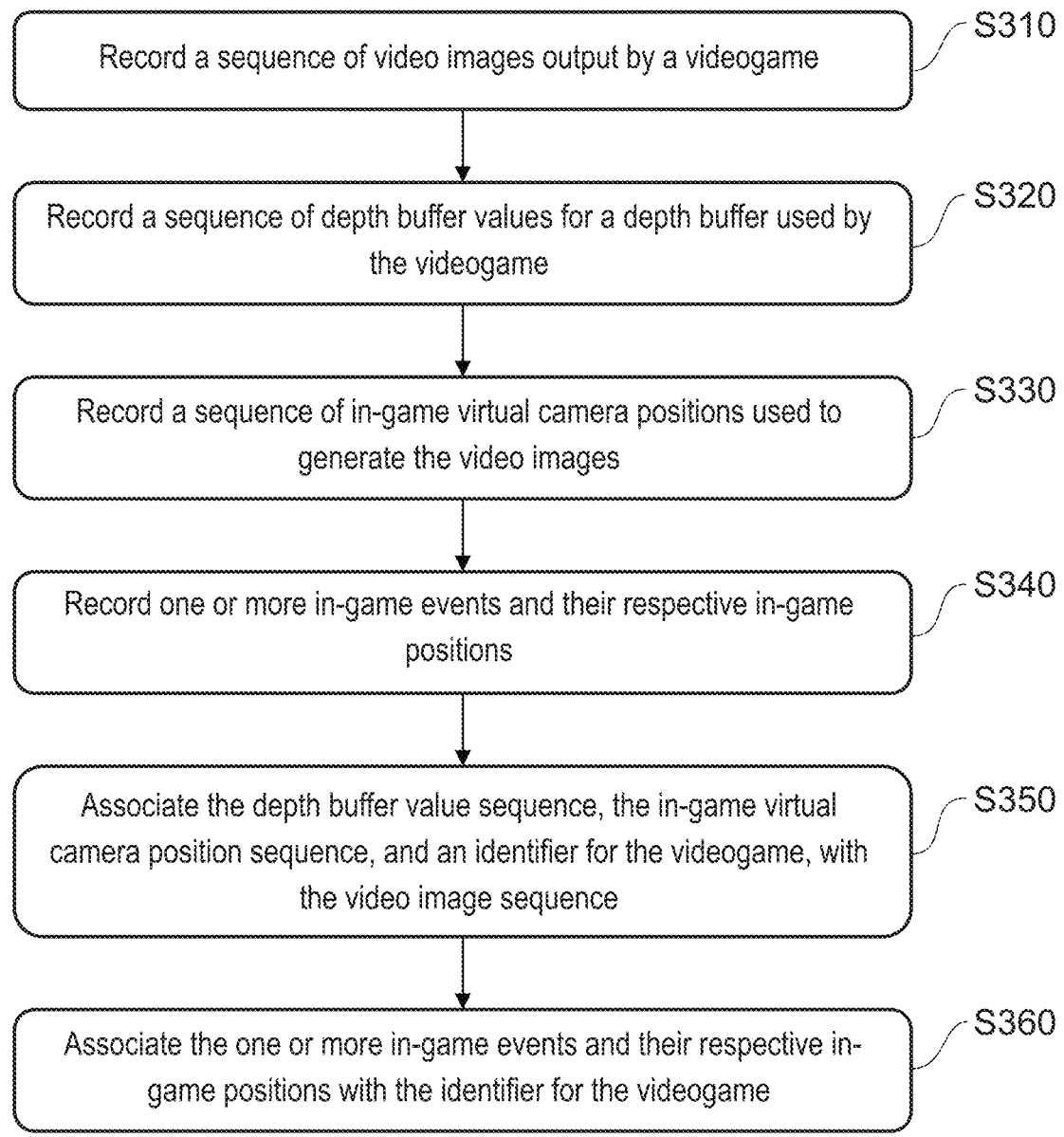
FIG. 3 is a flow diagram of a video recording method in accordance with embodiments of the present invention.

Turning now also to FIG. 3, the video recording apparatus 210A may operate according to the following video recording method in which:

A first step s310 comprises recording a first sequence of video images output by a videogame. For example, the PlayStation 4 routinely saves a video of the current video image output in a data loop that allows the last N minutes of gameplay to be stored, where N may be for example 20 minutes. Subsequently, in response to a user input, an in-game event or scheduled event, such video data can also be copied into long term storage, such as a disk drive of the entertainment device, or a remote host via a network, so that it is not lost when over-written in the data loop.

A second step s320 comprises recording a sequence of depth buffer values for a depth buffer used by the videogame. The depth buffer is used by the entertainment device when calculating which parts of a virtual scene are in front of each other and hence potentially occlude each other in the final rendered image. As such it can provide depth data for each pixel of the rendered image.

In one embodiment, an array of depth data of corresponding pixels of a rendered image can in turn be treated as depth image. Hence for example 8 bit or 16 bit depth values may be stored as an 8 bit or 16 bit grayscale image corresponding to the rendered image. The depth image can have the same resolution as the corresponding video image, or a reduced resolution version can be used (e.g. 50% size, have ¼ pixels).

Hence for example, for a conventional image format with three 8-bit data channels (e.g. for Red, Green and Blue), an 8-bit depth value could occupy one data channel, or a 16 bit depth value could occupy two data channels.

Figures 4A, 4B:
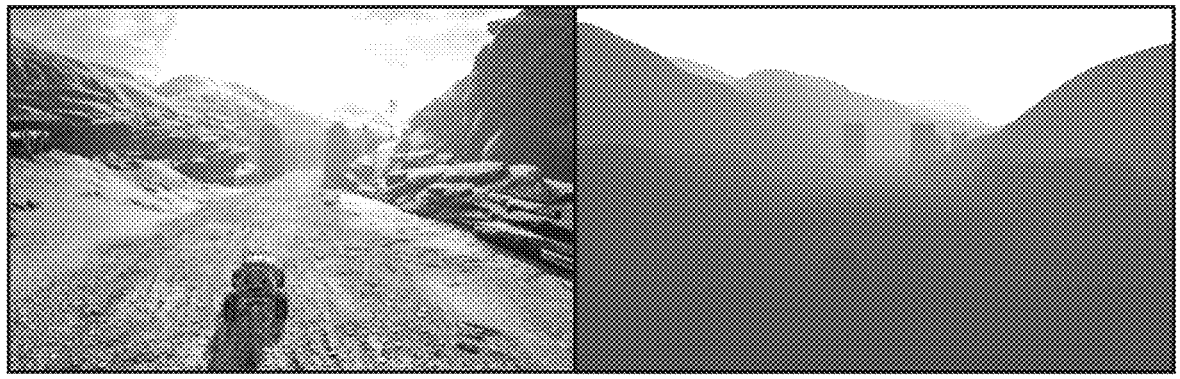
FIGS. 4A and 4B illustrate a video image and corresponding depth buffer information in accordance with embodiments of the present invention.

FIG. 4A illustrates a rendered image whilst FIG. 4B illustrates the corresponding depth image in two data channels.

Hence the step of recording a sequence of depth buffer values may comprise, for each instance of the depth buffer recorded, generating a depth image using at least one of a plurality of image data channels, of the depth image.

An alternative approach for recording a sequence of depth buffer values is described later herein.

A third step s330 comprises recording a sequence of in-game virtual camera positions used to generate the video images. The virtual camera position is the position of the camera used when rendering a output video image. The position can be defined as absolute positions with reference to a game world co-ordinate system, and/or relative to a global co-ordinate system with a predetermined origin (for example in this latter case, the location of the virtual camera in the first output video image could be set at the origin, with subsequent camera positions being relative to it). Optionally, as required, additional camera position information may be provided, such as one or more of camera orientation/rotation at the location, field of view, focal length, nearest drawing distance, furthest drawing distance, and the like.

The virtual camera position data may be recorded as a separate data stream or as metadata associated with the encoded depth data, as described later herein, but alternatively may be recorded by encoding the data in a different one of a plurality of image data channels not being used to record depth buffer values. Hence for example in an RGB image where the red and green colour channels are used to encode depth data, the blue colour channel may be used to encode camera location data. Hence in an embodiment of the present invention, the in-game virtual camera location data is recorded by spatially it as high contrast blocks in the respective image data channel.

Also optionally, where the game is not from a first-person perspective (i.e. when the player is not also notionally at the virtual camera position, but has an avatar displayed on screen), then the location of the player and further optionally also one or more of their orientation/rotation, speed, mode (e.g. running/walking) and/or pose may be recorded, using the same co-ordinate scheme or schemes as used to record the virtual video camera location data. Again this may be a separate data stream, metadata, or encoded within an image—for example together with the virtual camera data and in a similar manner.

Figure 5:
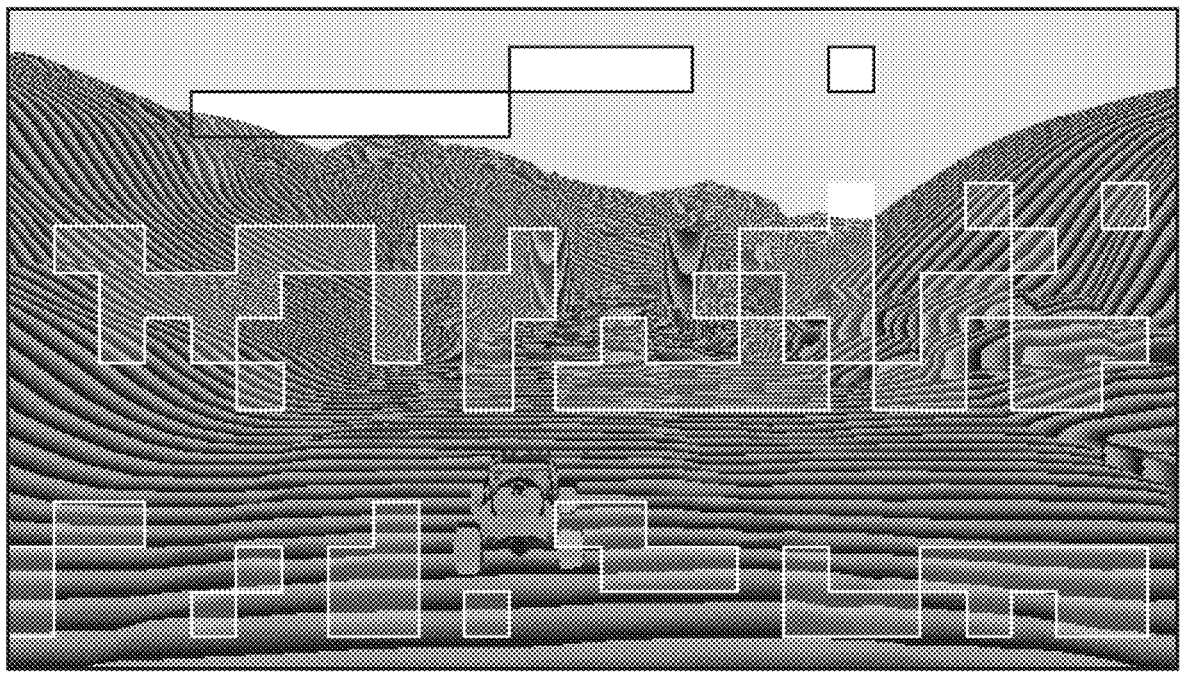
FIG. 5 illustrates an image encoding scheme for depth buffer information and additional data in accordance with embodiments of the present invention.

In a first example of encoding depth data within colour channels of a video image, FIG. 5 shows such an RGB image encoding depth data in the red and green channels, and camera/player location data in the blue channel, for the same image as that in FIG. 4A, and corresponding to the depth data illustrated in FIG. 4B. For a greyscale reproduction of the image, it will be understood that the blocky features represent the spatial encoding of camera and optionally player position data and the like in the blue channel. The block size may correspond to macroblocks of the encoded image, or may be of an arbitrary size depending on the amount of information to be encoded. The lower limit of block size will be defined by what block size can be reliably restored after any image compression/decompression used during video recording, hosting/storage/streaming as appropriate, and playback. Again for a greyscale reproduction of the image, it will be understood that the stripes in the terrain are caused by the lower 8 bits of the 16 bit depth data being in the green channel, causing the green value to cycle between 0 and 255 as the 16 bit distance value increases. The choice of R, G and B channels is arbitrary in this example. Hence this supplementary data can be provided as a second image sequence running in parallel with the video image sequence output by the videogame.

However, this scheme may be affected by higher compression rates often found in streamed videos online. Consequently a preferred set of alternative approaches for recording depth buffer data and optionally other data is now described.

In an embodiment of the present invention, two colour videos are recorded; a colour video of the rendered and displayed scene as described previously, and also a colour video encoding the 16-bit depth data, typically based on one of the following formats:

An H.265 video using the Main 4:4:4 16 Intra profile in 4:0:0 monochrome at a bit depth of 16 bits, or An H.265 video using the Main 4:4:4 16 Intra profile in 4:4:4 chroma sampling at a bit depth of 16 bits, or A video in a similar format such as High Throughput 4:4:4 16 Intra profile in 4:0:0 or 4:4:4 at 16 bits, for example in any HEVC version supporting these profiles, or equivalent coding schemes, and/or A UCL colour video, in which the 16-bit depth buffer is converted to three colour channels (e.g. RGB values), which can then be stored like a normal video using h264, AV9, h265 and the like.

The UCL colour video enables resilient compression of the depth data (treated as colour data), as explained in relation to live-action video within Fabrizio Pece, Jan Kautz, and Tim Weyrich; 'Adapting Standard Video Codecs for Depth Streaming', Joint Virtual Reality Conference of EuroVR—EGVE (2011), Editors R. Blach, S. Coquillart, M. D'Cruz, A. Steed, and G. Welch, the contents of which is incorporated herein by reference.

In summary, in a UCL colour video format the top 8 bits of a first colour channel are a linear mapping from the 16 bit depth data, to provide an approximate depth value. The second and third colour channels are then mappings (e.g. triangle waves) also applied to the 16 bit depth data and having a period at least twice the quantisation level of the depth data (e.g. for an 8-bit depth having 256 levels, the period would be ≤512), but with different phases. Due to the phase difference, they encode complementary high resolution depth information with respect to the spatial period of the function. The depth information can then be recovered by reversing the mapping in the first channel to provide a rough depth value, and then reversing the mapping of typically one of the second and third channels, depending on the value from the first channel, to obtain a relative depth value by which to adjust the rough value.

In another format that may be similarly considered, the 16 bit depth data is compressed to 8 bits in a lossy fashion, and stored in the top 8 bits of a first colour channel. Then a first correction layer (e.g. the difference between the original depth layer and a decompressed version for the data in the first colour channel) is stored in the top 8 bits of the second colour channel Finally, a second correction layer (e.g. the difference between the original depth layer and a decompressed version for the data in the first colour channel as corrected using the correction layer) is stored in the top 8 bits of the third colour channel. Alternatively correction data for a single correction step can be stored between both the second and third colour channels in their respective top 8 bits.

Put another way, in either format the first channel of 8 bits provides a rough but global depth value, whilst the second and third channels of 8 bits provide higher resolution depth information to adjust the rough estimate.

Also in either case, where the video codec comprises for example a 10 bit colour depth, then the 8 bits in each channel are even more robust to video compression.

Notably therefore in either case the 16 bits of the original depth data are stored as 24 bits of encoded depth data within a host data scheme (such as RGB data or similar such as YUV, YCoCg, YCbCr and the like), and preferably those bits do not include at least the lowest significant bit of the host data scheme—although it will be appreciated that some schemes allocate a different number of bits to different channels and so optionally, but less preferably, at least one but not all channels may be fully occupied by encoded depth data. Of course, if potential errors in depth information can be accepted, or the anticipated compression scheme will not affect bit values (or only to a degree that is visually acceptable), then the encoded depth data may occupy all the respective bits of some or all of the colour channels.

Notably whilst the above summary refers to colour channels, in some colour encoding schemes not all channels correspond to a colour per se (for example a channel may indicate luminance); however in each case the scheme as a whole serves to define a point in a colour space, and it is in this sense that the channels are referred to herein as colour channels, or equally as colour-space-descriptor channels.

It will be appreciated that 16 bits of depth data, and compression to 8 bits, in three channels, are all exemplary only. More generally in a UCL colour video, N-bit depth data (where N is typically 16) may be encoded to M bits (where M is typically 8) per colour-space-descriptor channel, and typically M<P, where P is the native bit depth of the respective channel in the host data scheme, and M is preferably 1 bit, or more preferably two bits, fewer than P. The number of colour channels used is typically three (e.g. YUV), but may be different (e.g. CMYK).

Hence more generally encoding the depth buffer value sequence comprises encoding depth data of a first bit depth across a plurality of the colour space descriptor channels used by a selected video scheme, such that a first channel encodes data indicative of depth to a first level of accuracy, and the or each subsequent channel encodes data that, in conjunction with the data of the first channel, is indicative of depth to a second, higher level. Typically, during this encoding the depth data in each channel is then encoded to a bit length shorter than the bit length of the respective channel, although this is not essential.

Accordingly, both the colour video of the rendered environment and the colour-encoded video of the depth data can both be encoded and/or compressed by a conventional video coding technique such as h.265, for example so as to be streamed to one or more viewers, and the quantisation of the depth information will typically be preserved in a manner as robust (or more) than that of the colour data in the rendered video.

Optionally to provide ease of transmission and synchronisation, the two videos may be encoded as a stereoscopic pair (despite not being so). A fourth step s340 comprises recording one or more in-game events and their respective in-game positions, using a similar scheme to that for the virtual camera location and optional player location. The choice of what in-game events to record in this manner will be made by a designer, but may typically include one or more of crashes/character deaths, overtaking/beating a real or computer based opponent, changing an in-game state of the user (e.g. changing equipped weapons or the like, or engaging a nitrox boost in a car), and player choices (such as turning left or right to avoid an obstacle, or electing to jump over it). In this latter case, the choice may be associated with a predetermined in-game decision point that may be location based (e.g. an obstacle or path choice) or may be logical (e.g. when navigating a dialog tree with an in-game character). In the case of a location based choice, due to user variability regarding when they respond to the choice, the choice made may be associated with the position of the in-game decision point rather than the position of the user or camera, to assist with subsequent analysis of the decision. Alternatively or in addition, such a decision may be encoded when made by the user, or when the in-game decision point is at the nearest draw position with respect to the virtual camera, or at some other predetermined relationship with the virtual camera (for example within a predetermined distance) so as to provide predictability as to which video image may be associated with the choice data, or the choice data may be encoded for each image between these two moments (or similarly for any video frame where the camera and/or user avatar are within a predetermined distance of the in-game decision point). In addition to location specific events, on-going events may also be recorded. Hence optionally for each video image, the current user input or inputs (e.g. buttons pressed, or associated input values) may also be recorded in a similar manner to provide an approximate record of the user's interactions with the game, and similarly the user's in-game position (e.g. avatar position) may be treated as an ongoing event if different from the camera position. As is noted later herein, whilst this recording step typically occurs during game play and reflects events arising directly from game play, alternatively or in addition the recording step for such in-game events may occur after the video images and other data have been output, and optionally after they have been broadcast/streamed; that is to say, a viewer subsequently watching the video using a viewer compatible with the techniques herein with have sufficient information available to define their own in-game events after the fact. These may then be shared, e.g. by reposting the updated video, or by transmitting them to a central server, as appropriate and as described later herein.

As is noted above, the data is recorded for each of a sequence of video images output by the videogame, but generally is not recorded as part of the sequence of output video images itself but instead is recorded as a parallel sequence of data with at least the depth data encoded as video images.

In the preferred colour video encoding approach, the other information described herein as being encoded within a colour data channel, such as the virtual camera position, and optionally an avatar position and/or in-game event positions, may be stored as a separate data stream within the colour encoded depth video (or potentially within the video of the rendered output, or potentially in both to provide redundancy, or across both the reduce or balance individual overheads, for example to assist with synchronous streaming of the videos).

For example, this data may be stored in one or more extensible metadata platform streams or similar, respectively associated with one the two videos. Alternatively the selected video scheme may comprise user fields that may accommodate this data.

Hence in a fifth step S350, the depth buffer value sequence is encoded as a second sequence of video images; and in a sixth step S360, the in-game virtual camera position sequence is associated with at least one of the first and second sequence of video images (typically the second sequence of video images).

In a further optional step, an identifier for the videogame is also associated with one or both video image sequences (together with any of the optional additional information also encoded, such as player position, user choices and the like).

The identifier enables subsequent analysis of the video sequence without the need for image-based recognition of the game from which the video sequence has been recorded. The identifier may simply be the name of the game in plain text, or a unique issue number associated with the game. For simplicity, the identifier may correspond to an identifier already associated with the game, for example for the purposes of registering ownership of the game with an administrative service associated with the host videogame console.

Optionally one or more in-game events and their respective in-game positions are associated with the identifier for the videogame.

The in-game events, their respective in-game positions, and the identifier for the videogame may then optionally be uploaded to a remote server operable as the event analyser 220, which receives such data from a plurality of client devices acting as video recording apparatuses, and identifies statistically significant features of the data, as described later herein.

The in-game events and their respective in-game positions may alternatively or in addition be encoded along with the depth buffer value sequence, the in-game virtual camera position sequence, and the identifier for the videogame within a colour channel of the supplementary image sequence, thereby (also) associating them with the identifier for the videogame in this manner. This allows the specific instance of the in-game events to be associated with the specific video recording.

Optionally, each recorded image sequence of a videogame (video recording) may have a unique video ID, which may optionally be transmitted to the event analyser. The event data may then be transmitted to the event analyser in association with the unique video ID. Subsequently the event analyser may then optionally transmit the event data, in addition to any statistical analyses, back to a video playback device that transmits the unique video ID to it.

Similarly optionally the depth buffer value sequence and/or the in-game virtual camera position sequence and any of the other optional data (such as player avatar position) could also be uploaded to the event analyser in association with the unique video ID.

If all the supplementary data is uploaded in this fashion, it may be provided to the server as a parallel video recording encoded as described previously herein, or as the separate data elements for the server to encode in this manner.

Subsequently when a video playback device transmits the unique video ID found in a video recording, it can receive all of the supplementary data, for example as a parallel video recording encoded as described previously herein.

Alternatively or in addition, the video recorder could upload the parallel video recording to an online host (such as YouTube® or Twitch®) first, obtain the URL associated with the hosted recording, and embed this URL in a user field of the video recording of the game before also uploading that to the online host. Equivalently, after uploading the parallel video recording to the on-line host, using the unique video ID as the video name, the video recorder could embed the video ID in the user field of the video recording to be subsequently used as a search term with the on-line host.

In either case, as long as the unique video ID or URL remains associated with the original video (for example in a user field of the video), then a video playback device adapted to implement techniques disclosed herein can access the desired supplementary data either by requesting it from to the event analyser or accessing the parallel hosted video from an on-line host, whilst the video itself remains otherwise conventional and able to be handled and transmitted by conventional or legacy devices and applications without special regard to also handling and transmitting non-standard supplementary data relating to these techniques.

Figure 6:
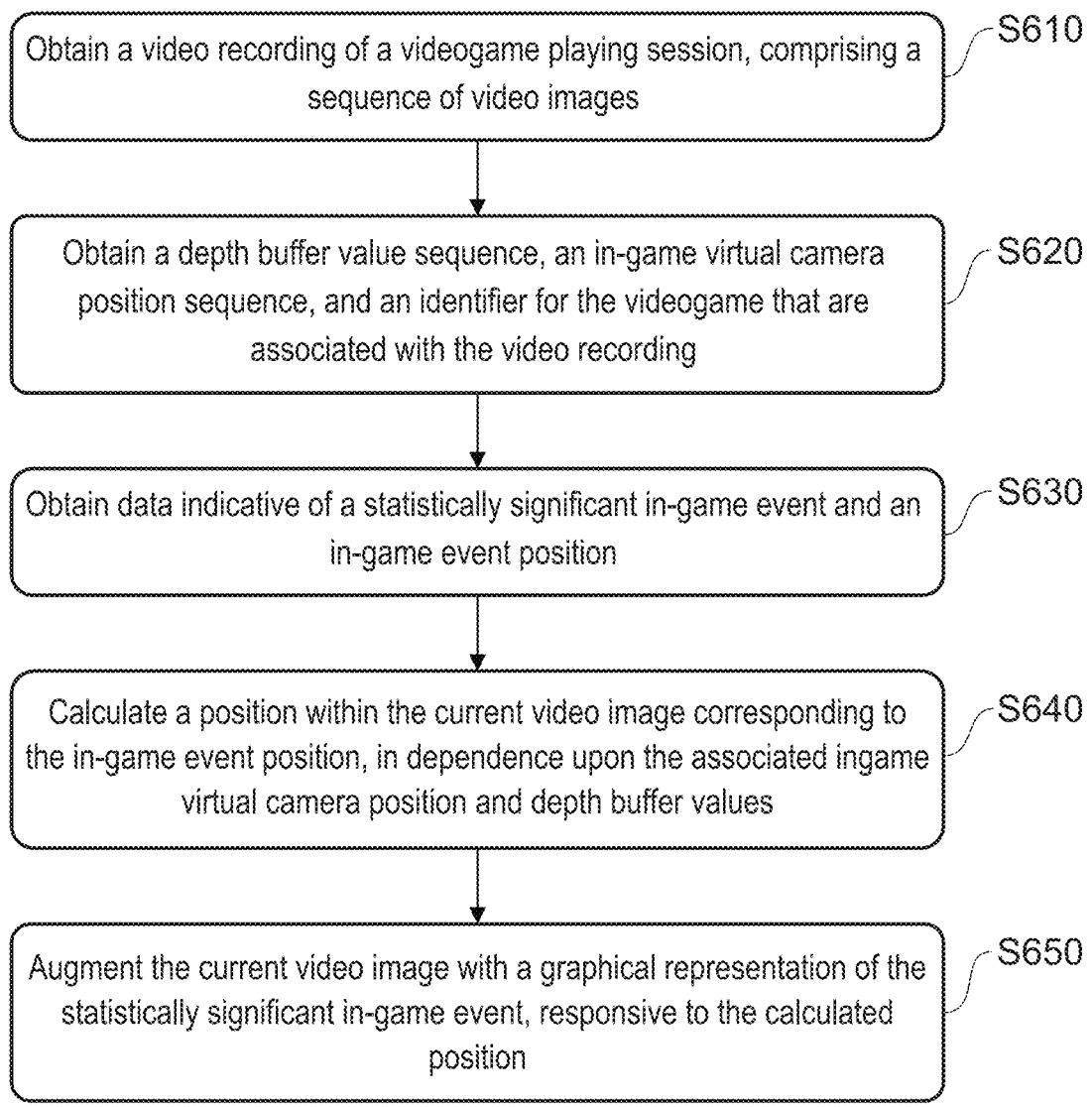
FIG. 6 is a flow diagram of a video playback method in accordance with embodiments of the present invention.

Turning now to FIG. 6, the video playback apparatus 210B may operate according to the following video playback method in which:

A first step s610 comprises obtaining a first video recording of a videogame playing session, comprising a sequence of video images. This may be done by any suitable means, such as downloading a video file, streaming a video stream for a web service such as YouTube® or Twitch®, or accessing a video recording already in a local memory (such as an HDD 37 or BD ROM 36/36A) of the playback apparatus.

A second step s620 comprises obtaining a second video recording generated by encoding a depth buffer value sequence (such as the H.265 and UCL examples herein).

A third step s630 comprises obtaining an in-game virtual camera position sequence associated with at least one of the obtained video recordings, for example as a data file provided with a video recording, or a metadata extension, or a user field. Optionally additional data such as avatar positions and in-game event data may also be included.

Alternatively such a parallel video recording comprising encoded data, and/or one or more of the other data sequences (camera position, avatar position, event position etc.), may be accessed by reference to a unique video ID obtained from a data field of a received video recording and submitted to the event analyser server, or alternatively by reference to a URL or search term obtained from a data field of a received video recording that is used to access the data from a data hosting service.

It will be appreciated that the supplementary data may be downloaded in its entirety, or alternatively streamed at the same rate as the video recording of the videogame (and as applicable the depth data video) so that the supplementary data is provided in a just-in-time manner Optionally the supplementary data may be streamed with a predetermined frame offset (for example 1, 2, 3 or more frames in advance relative to the video recording of the videogame) to provide sufficient processing time to have processed information ready for reception of the corresponding video frame of the videogame, and/or to provide any smoothing, averaging or error correction functions for supplementary data that would depend upon receipt of subsequent frames of supplementary data. This could be achieved by padding the video recording of the videogame with the desired predetermined number of blank frames at its start, or delaying playback of the video recording of the videogame by the desired predetermined number of frames. Such a processing time offset may also optionally implemented if encoding the game footage and depth video as a stereoscopic pair, so that the depth video is a predetermined one or more frames in advance of the game footage.

As noted above, optionally in-game event data may be obtained at this stage, thereby subsequently allowing augmentation (e.g. displaying a path taken, or a user comment) responsive to that in-game event by itself.

However, alternatively or in addition, an optional further step S635 comprises obtaining data indicative of a statistically significant in-game event and an in-game event position. As described elsewhere herein, this data is obtained from the event analyser, either as a file, or streamed to the video player during playback. The data typically comprises data indicative of the in-game event analysis data, e.g. data relating to the significance of the event and optionally other statistical data (and typically also the type of event, etc., to assist with selecting how to graphically represent the event).

As was noted previously, the choice of what in-game events have been recorded may have been made by designer and may include one or more of crashes, character deaths, overtaking or beating an opponent or indeed being overtaken or beaten by an opponent, changing the in-game state of the user, player choices and/or player inputs. As noted above, augmentations based upon these events per se may be provided. However, optionally this data may be analysed as described elsewhere herein, and data relating to this analysis may then be associated with the event location.

If the data is subsequently downloaded as a file in advance of video playback displaying a particular in-game location, then the event location may be used to decide when to use the event analysis data, whereas alternatively or in addition when the data is subsequently streamed in synchronisation with playback of a recording of the videogame, then the event analysis data may be streamed according to when the recording of the videogame reaches the event location, optionally in terms of a predetermined offset from the camera position or optionally from the player avatar position for that moment in the recording.

A fourth step S640 then comprises calculating a position within a current video image of the first video recording (the game footage) corresponding to the in-game event position, in dependence upon the associated in-game virtual camera position and decoded depth buffer values obtained from the second, depth video.

Hence if for the currently displayed video image of the videogame the position of the camera using the in-game or global co-ordinate system is known, and the depth data of the pixels in the display video image are known or can be interpolated from the associated depth data, then in effect the in game or global (X, Y, Z) coordinate of each pixel in the currently displayed video image of the videogame can be determined. Accordingly, the position of the in game event within the currently displayed video image can be determined.

In particular, if for a given event, the corresponding X, Y coordinate in the currently display video image is determined to have a Z coordinate that is closer than the Z coordinate of the event, then in effect the event is obscured from the current viewpoint of the display video image by an object within the virtual environment depicted within the video image.

Using this information, at a fifth step s650 a video playback device can augment the current video image with a graphical representation of an in game event, responsive to the calculated position. In particular the video playback device can decide whether or not to occlude some or all of a graphical representation of the in game event based on whether elements of the displayed environment are currently in between the game event location and the viewpoint presented by the video. For example, the video playback device may prepare for rendering a simple polygon based object such as a tetrahedron, acting as a pointer, and then use the Z values of the video image to perform a so-called z-culling on the tetrahedron in a final render so that the tetrahedron appears to be naturally embedded within the environment of the video, being occluded as suitable from the current viewpoint of the virtual camera that recorded the video image. Hence the technique may comprise calculating, in dependence upon the depth buffer values, any occlusion of the graphical representation at the calculated position caused by foreground elements of the video image.

The playback device may not augment every obtained in-game event. For example, the viewer may be able to toggle which event types to display, or set an event threshold (for example, only show an event that add more than a threshold value to the score). Similarly, the playback device may also show statistically significant in-events or a subset, or only show statistically significant events or a subset, depending on playback settings.

Figure 7:
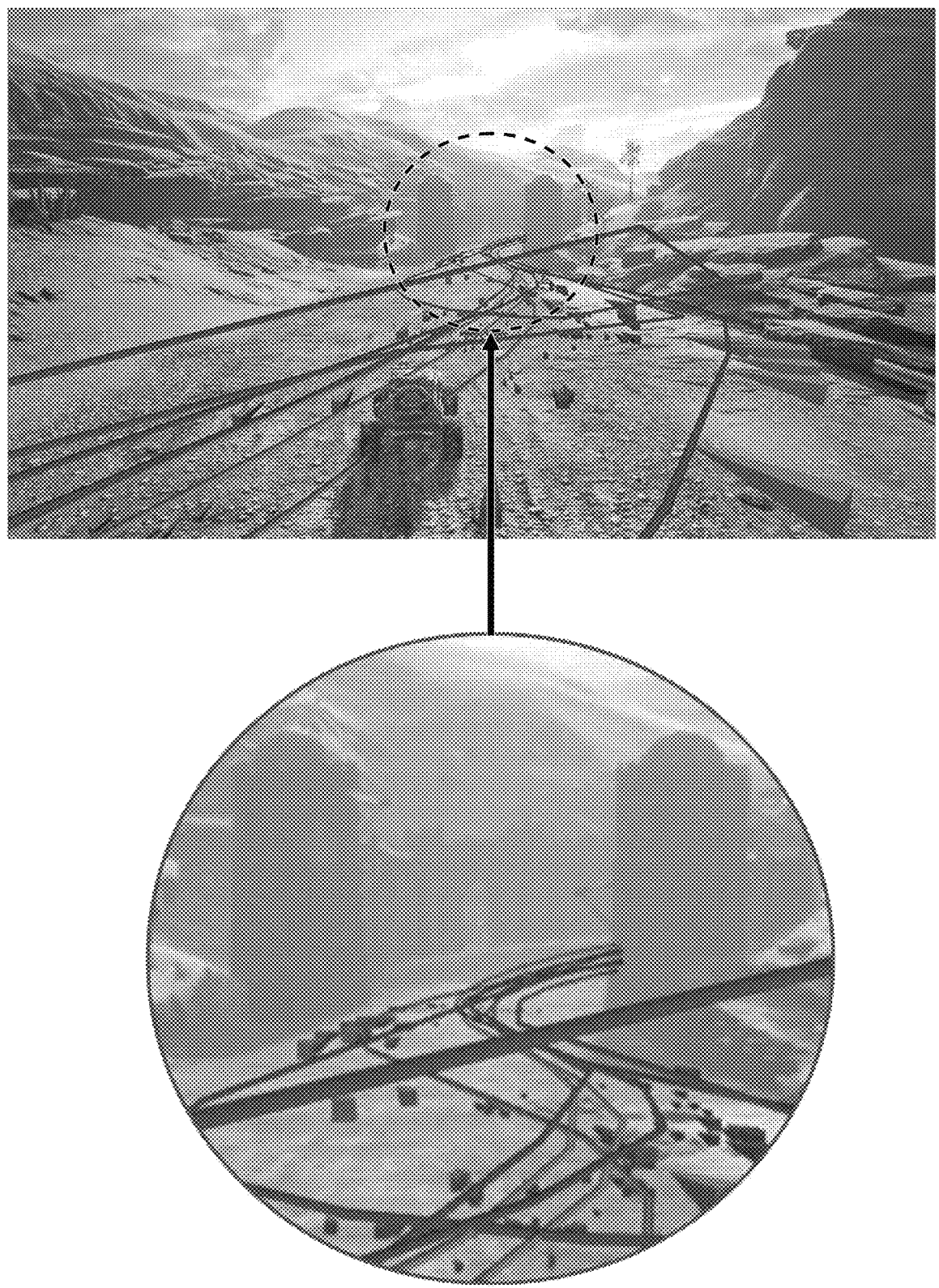
FIG. 7 illustrates an augmentation of a video with a graphical representation of a statistically significant in-game event, in accordance with embodiments of the present invention.

FIG. 7 illustrates this augmentation for the example video image of FIG. 4A. In this figure, paths of other players (for example particularly fast or slow players in red or blue tracks respectively) are shown. For a greyscale reproduction, the specific meaning of each track is not necessary to an understanding of the invention. Notably, as seen in the expanded section, the tracks disappear behind features of the environment as the Z position of the track data exceeds the Z position of the features within the video image.

FIG. 7 also shows simple polygon objects (in this case tetrahedra) indicating events such as vehicle skids or braking. It will be appreciated that more elaborate, visually appealing and informative indicator objects, optionally with textures of their own, may be used for this purpose, and that typically a different respective graphical representation will be used for corresponding different event types. It will be appreciated that other graphical effects may be applied, such as reducing the brightness of video pixels whose x, y, z position intersects a line in a predetermined direction from an indicator object, thereby creating an apparent shadow of the indicator object within the videoed game environment, and so improving the apparent immersion of the indicator object. Similarly, the video playback device may analyse the effective resolution or compression rate of the video, and degrade the effective resolution of the indicator object to substantially match this (for example by pixelating and/or blurring the rendered object), so that the indicator object appears to be more part of the background video image.

Optionally, the video playback device can also obtain an in-game player position sequence associated with the video recording. Again as described previously this can be in a separate file or stream or encoded within a parallel image sequence. The augmenting stage may then comprise displaying a relationship between the current player position in the video and one or more event positions. This may variously take the form of indicating distance/countdown values between the player position and the event position, adding a line, arrow or path between the player position and the event position, only showing or fading in the indicator object associated with an event when the distance between the player position and the event position are within a predetermined threshold, and the like.

Figure 8:
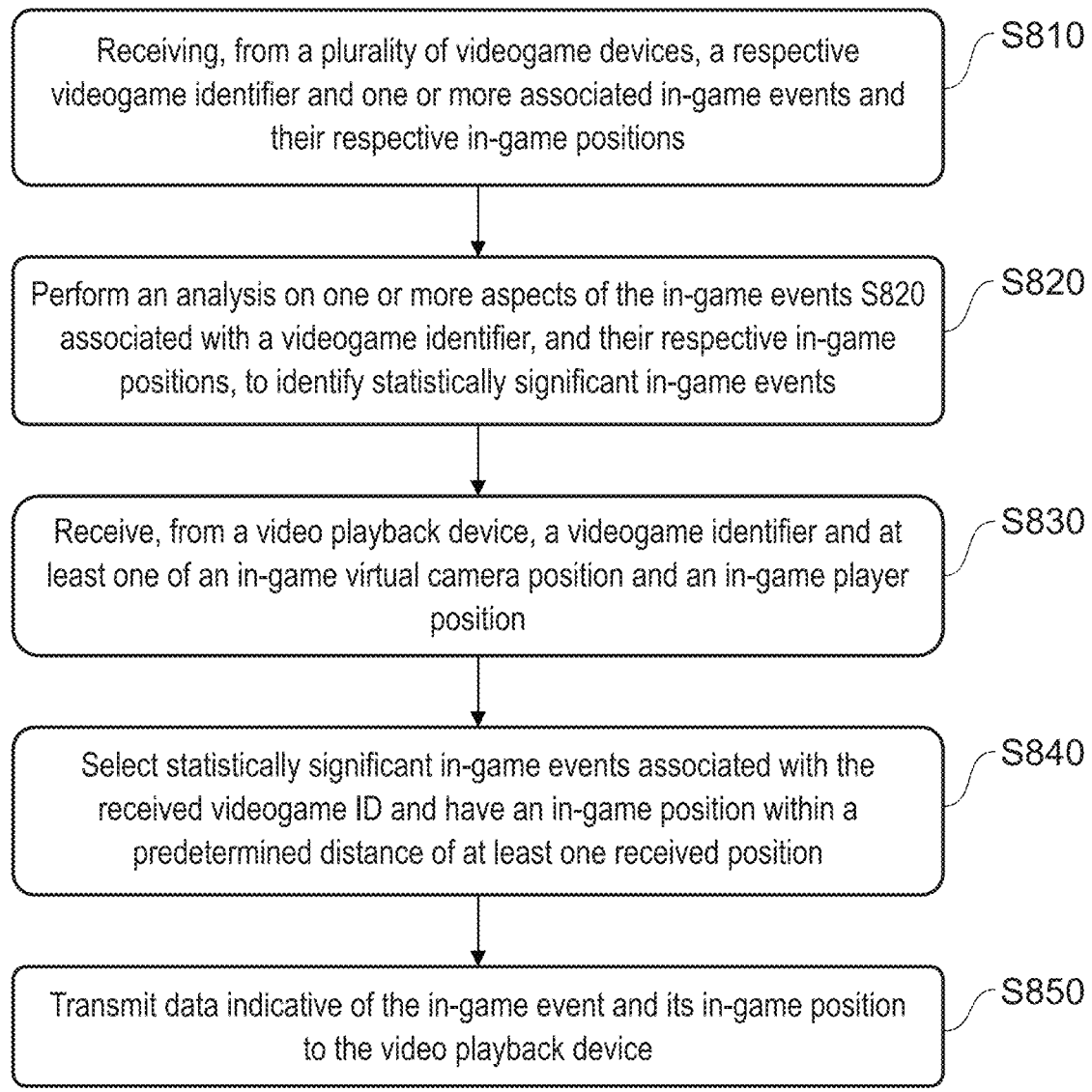
FIG. 8 is a flow diagram of an event analysis method in accordance with embodiments of the present invention.

Turning now to FIG. 8, the server operating as an event analyser 220 may operate according to the following event analysis method, in which:

A first step S810 comprises respectively receiving, from a plurality of videogame devices (acting as video recording apparatuses), a videogame identifier and one or more associated in-game events and their respective in-game positions. Hence as described previously herein, the event analyser receives data relating to a particular videogame that identifies in-game events, and where they occur within the game, from a plurality of videogame devices.

As noted previously herein, optionally the event analyser may receive any of the other supplementary data recorded by a video recording apparatus, together with a unique video recording ID.

A second step S820 then comprises performing an analysis on one or more aspects of the in-game events associated with a videogame identifier, and their respective in-game positions, to identify statistically significant in-game events.

This may be done for example by performing a geospatial analysis of a plurality of events of a similar kind to identify hotspots, cold spots and other group statistics indicative of the behaviour of a corpus of players for that kind of event, or for a particular instance of an event at a particular position.

An example form of geospatial analysis may be the known Getis-Ord-Gi* statistic. This analysis evaluates features with respect to their neighbours, so that clusters of similar features gain significance with respect to a global evaluation and are thus identified as hot-spots. Cold-spots may be identified in converse fashion if required.

An aspect of significance for an event can be selected by weighting for it. Hence for example a set of points in game space relating to where users applies the brakes in a racing game can be weighted according to the respective eventual lap times associated with each point.

The analysis then generates a z-score for each point separately (e.g. which reflects how many neighbours also had high weights), and a p-value, indicating if this point is an anomaly.

These analyses can be performed for a particular game title periodically, and/or in response to receiving more data for that game (for example after receiving 1, 10, 100, 1,000, 10,000 or 100,000 additional datasets, as appropriate).

It will be appreciated that different aspects of an event or event type can be analysed separately in this fashion depending on the weighting used. For example, braking events could be analysed with respect to lap times or whether or not the lap was completed, vehicle types, or user demographics.

To this end, it will be appreciated that other information about game play may also be recorded by the video recording apparatus, which may be referred to as session data; i.e. not events within the game play per se, but information about the game play, such as difficulty setting, player skill level or equipment used, final outcomes (times, scores, achievements, rankings or the like) determined after completion of a level, and so-on. In the event that only part of a level is video recorded, the video recording apparatus can thus optionally append such data to the video recording once a level (or other logical point at which to obtain such values) is reached, even if the video recording itself has ceased. Such session data may be stored as a separate file or encoded in any suitable manner within the game video recording or parallel video recording. For example, the session data may be included as one or more frames at the beginning or end of the parallel video recording.

Alternatively or in addition to such geospatial analysis, a user-generated event marker or user ID may be associated with a particular uploaded set of event data.

This allows the event analyser to provide event data corresponding to specific individuals, such as for example players found on a user's friend list associated with their own user ID. In this way, alternatively or in addition to statistical analyses of a wider corpus of players, individual choices and events from friends of the viewer of the playback may be shown as an augmentation of the video, and/or a geospatial analysis restricted to just their friendship group.

This principle could also be extended to clans, teams and other self-identified groups though user-generated markers, so that for example e-sports teams could augment a video posted by a competitor with just an overlay of their performance data.

Expanding further, the geospatial analysis can be performed multiple times for different corpora of players, to provide analyses based on location (e.g. national stats) and demographics, such as age and gender. Such information is generally available from the registration details held in association with each user ID.

In any event, subsequent to the analysis, a third step S830 comprises receiving, from a video playback device, a videogame identifier and at least one of an in-game virtual camera position and an in-game player position.

Hence in addition to receiving data from video recording apparatuses, the event analysis server also receives data requests from one or more video playback apparatuses. The requests identify the videogame in the video so that the event analyser knows what data set to reference (although this may be implicit, for example when an event analysis server is dedicated to supporting only one game, then the act of sending a request to that server constitutes identification of the relevant videogame and data set).

The requests also include at least one of an in-game virtual camera position and an in-game player position. Depending on how the data is transmitted back to the video playback apparatuses, this can take different forms. If data for an entire level (or segment/branch etc. of a level or region) is to be downloaded, then identification of the level serves to identify the position of the camera/player to the extent needed to acquire relevant data.

Meanwhile if the data is being streamed, then the current position of the camera/player corresponding to a displayed frame of the video stream (or optionally a predetermined number of frames ahead, to account for access and network latency) may be used. This allows the received data stream to track the progress of events within the video, which are likely to differ between individual videos due to how each user plays the game, and what events they experience (such as a car crash or breakdown instead of smooth driving) that would otherwise make prediction of what events are relevant to the current video display difficult.

It will be appreciated that in between position updates on a once-per-level and every-frame basis, a number of schemes may be adopted within the technique, such as time or distance based periodic updates of position (e.g. every N seconds or M metres, where N or M are predetermined values). Optionally, triggers may be encoded within the video itself (e.g. a flag or value in a user field) by the video recording apparatus, corresponding to when events occurred during game play, so that when these are encountered during playback then the corresponding camera or player location is transmitted to the event analyser in order to receive data about the corresponding event.

In any event, in response then in a step fourth step S840 the event analysis server selects analysis data relating to one or more identified statistically significant in-game events associated with the received videogame identifier and having an in-game position within a predetermined distance of at least one received position (as noted above, corresponding to a level, periodic time or distance, or current or impending video frame). The predetermined distance may be the draw distance of the videogame, so that an indicator object for the event can appear as if it is part of the in-game render, but in principle may be any predetermined distance from the received position.

The selection of analysis data may follow one or more principles. For example, data that has the greatest significance for an event may be chosen (for example, if users are presented with a choice to turn left or right, and 95% of players who turn right complete the level whilst 95% of player who turn left to not, then this aspect of the decision event is more significant than whether 60% of cars turn right and 60% of motorbikes turn left). Alternatively, data that relates to the apparent choice/event of the player in the video may be preferentially selected. Similarly, data that relates to preferences set by the viewer of the video may be chosen, such as looking for the most common events, or the least common events, or preferred events such as crashes, but not overtaking.

Finally, in a fifth step S850 the event analysis server transmitting data indicative of the in-game event analysis data and its in-game position to the video playback apparatus. Then as noted previously, the video playback apparatus can use the data to construct an augmentation layer for the video, as illustrated in FIG. 7.

It will be appreciated that because the location of in-game events is itself constrained by the rules and environment of the game, the cumulative event data received by the event analysis server will be consistent for that game (e.g. all events related to overtaking will be on positions corresponding to the race track, or at least to positions where overtaking is legal within the game). As a result, the locations associated with event analysis data and the locations associated with the camera/player within the current video will be consistent with each other and the game environment within the video (as per FIG. 7), and hence appear to interact naturally even though the event analysis server and the video playback apparatus may not have any explicit knowledge/model of the actual virtual environment within the game.

It will be appreciated that in principle a videogame console could operate as both a video recording apparatus and a video playback apparatus, so that a user could review their own play almost immediately with the benefit of statistical event data overlaid on top. Furthermore, a videogame console could in principle also operate as an event analysis server, for example analysing historical records of play by one user, such as a professional e-sports player, to assist them in identifying trends in their play.

Variations of the above techniques can also be envisaged.

For example, it is common for video compression to effectively reduce colour bit depth. This creates slightly flat areas of colour but has limited impact on most video. However, if the colour channels are being used to encode depth data then this compression could affect the depth data significantly.

A possible solution includes using only higher significance bits within the channels (e.g. only 6 bits in an 8 bit channel, or 8 bits in a 10 bit channel, or 10 bits in a 120 bit channel).

Another solution notes that if a 16 bit depth value is encoded across two 8 bit colour channels, that separately have low significance bits affected by compression, then in effect mid-significance bits of the depth value can be corrupted. However, if bits are alternated between the two colour channels (e.g. so that bit 1 (depth) becomes bit 1 (green), bit 2 (depth) becomes bit 1 (blue), bit 3 (depth) becomes bit 2 (green), bit 4 (depth) becomes bit 2 (blue), and so on, then only low significance bits of the depth data would be affected by compression in this manner.

The use of the received analysis data can very to suit the style of the game that has been videoed. For example, providing a commentary that simply says whether a player took the popular or unpopular choice at certain points in-game may be applicable in some cases, whilst a lot of graphically complex statistics relating to the positions of multiple players may be appropriate in another game.

Similarly, the event analysis server may provide graphical data (indicator geometries, textures etc.) in response to the receive videogame identifier, so that the video playback apparatus has graphics assets to highlight events that are graphically in keeping with that particular game in the video (since the video playback apparatus may not have the game installed itself and may have no information about it or assets for it).

Whilst the description refers to use of a parallel video recording of depth data, and suggests that camera and event data etc., is also encoded within a data channel of that parallel video recording, in principle such data could be included within user data fields of a video codec that supported such fields, so that some or all of the data was directly included with the video recording of the game play. This may be an option where the videos are hosted by a non-legacy service that has been adapted to accommodate the present techniques (for example by retaining such data fields, or not applying lossy compression to them).

The techniques described herein enable the overlay of paths taken by different players (e.g. as shown in FIG. 7), and other information, on a race track or any other traversable virtual environment, using the depth buffer and in-game virtual camera positions to display these with the appropriate depth.

It will be appreciated that these techniques may facilitate the augmentation of video-recordings of game play for a number of uses. For example, graphics providing commentary and analysis may be overlaid on top of e-sports coverage.

Other examples include that a user can add a virtual object to a replay of a user's video. The virtual object may be, for example, a marker or a message in the form of a 3D callout with text. Typically, the user defines an after-the-fact in-game event for which a virtual object or graphical effect is provided.

Figure 9:
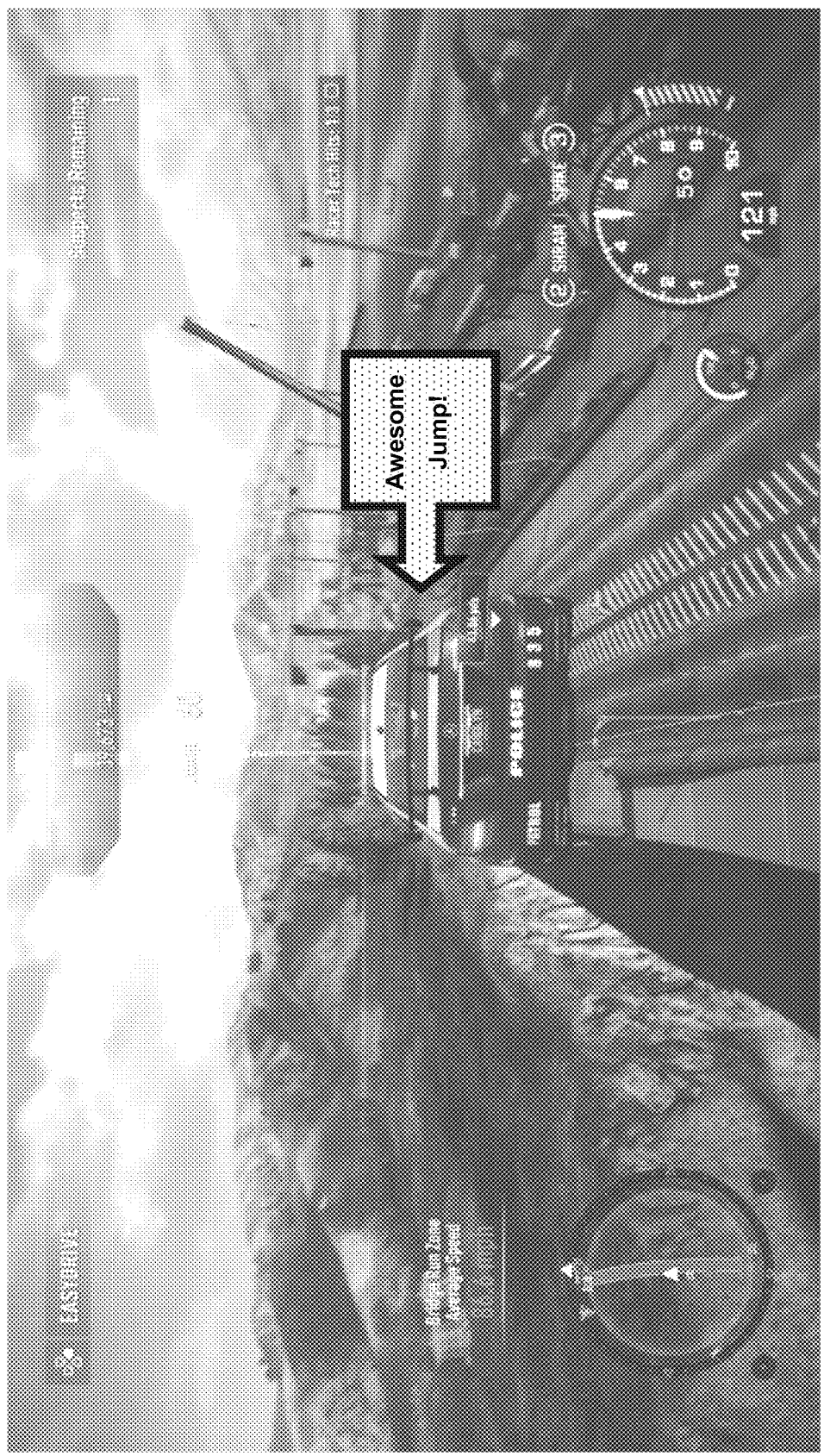
FIGS. 9 to 12 are example illustrations of possible augmentations of a video recording of gaming footage, in accordance with embodiments of the present invention.
Figure 10:
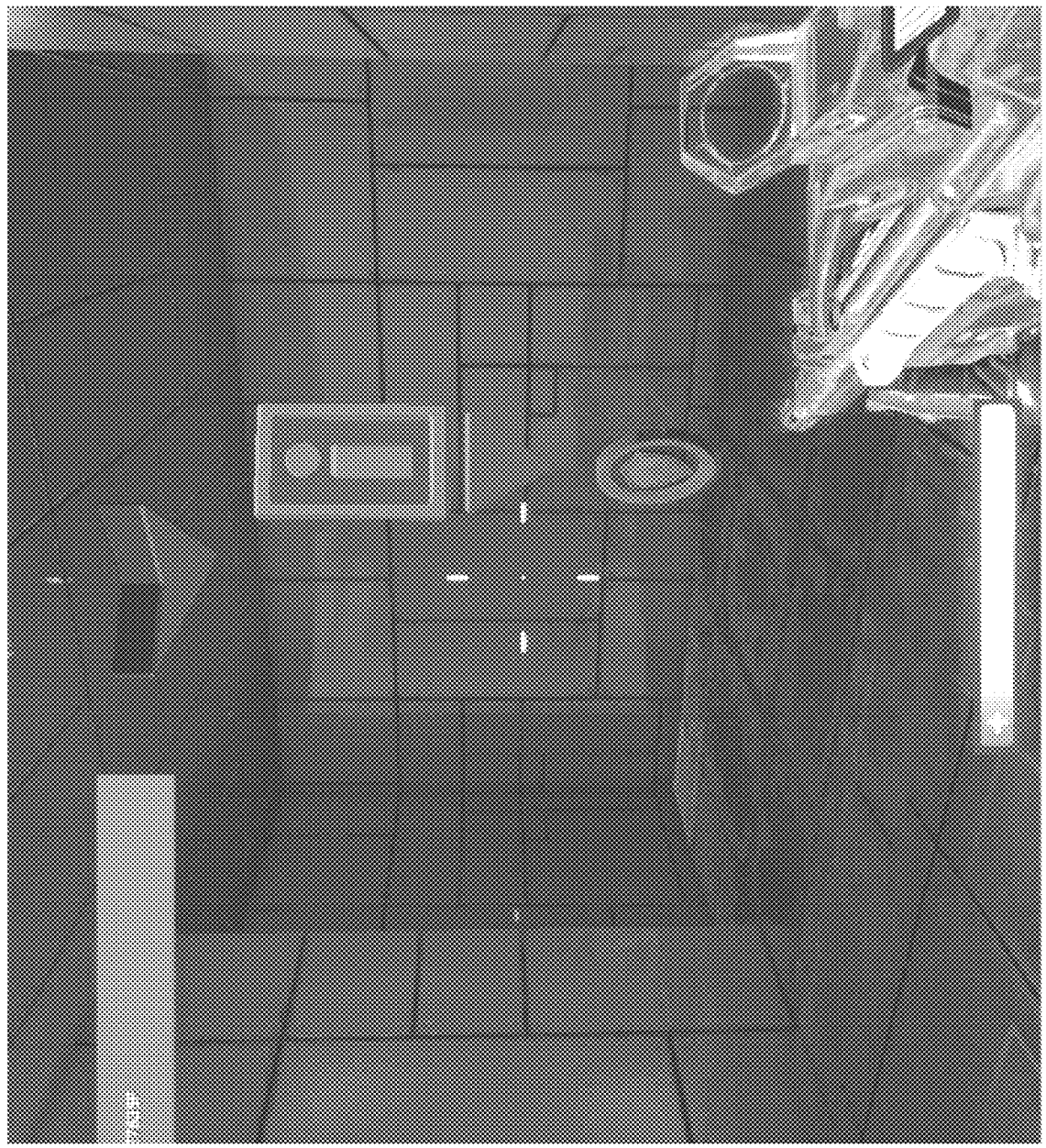

For example, on watching back a video of a player completing a race track, a viewer might leave a message like "awesome jump!" at the point where the player makes the jump, or indicating the peak height of the jump, as shown in FIG. 9. Where an object chosen to indicate such an event is itself 3D, they may thus have a position and orientation that is consistent with the environment within the video, so that they appear as if part of the originally captured footage. An example is of an arrow set by the original player or a subsequent viewer of the video that points to hidden treasure, as shown in FIG. 10.

Figure 11:
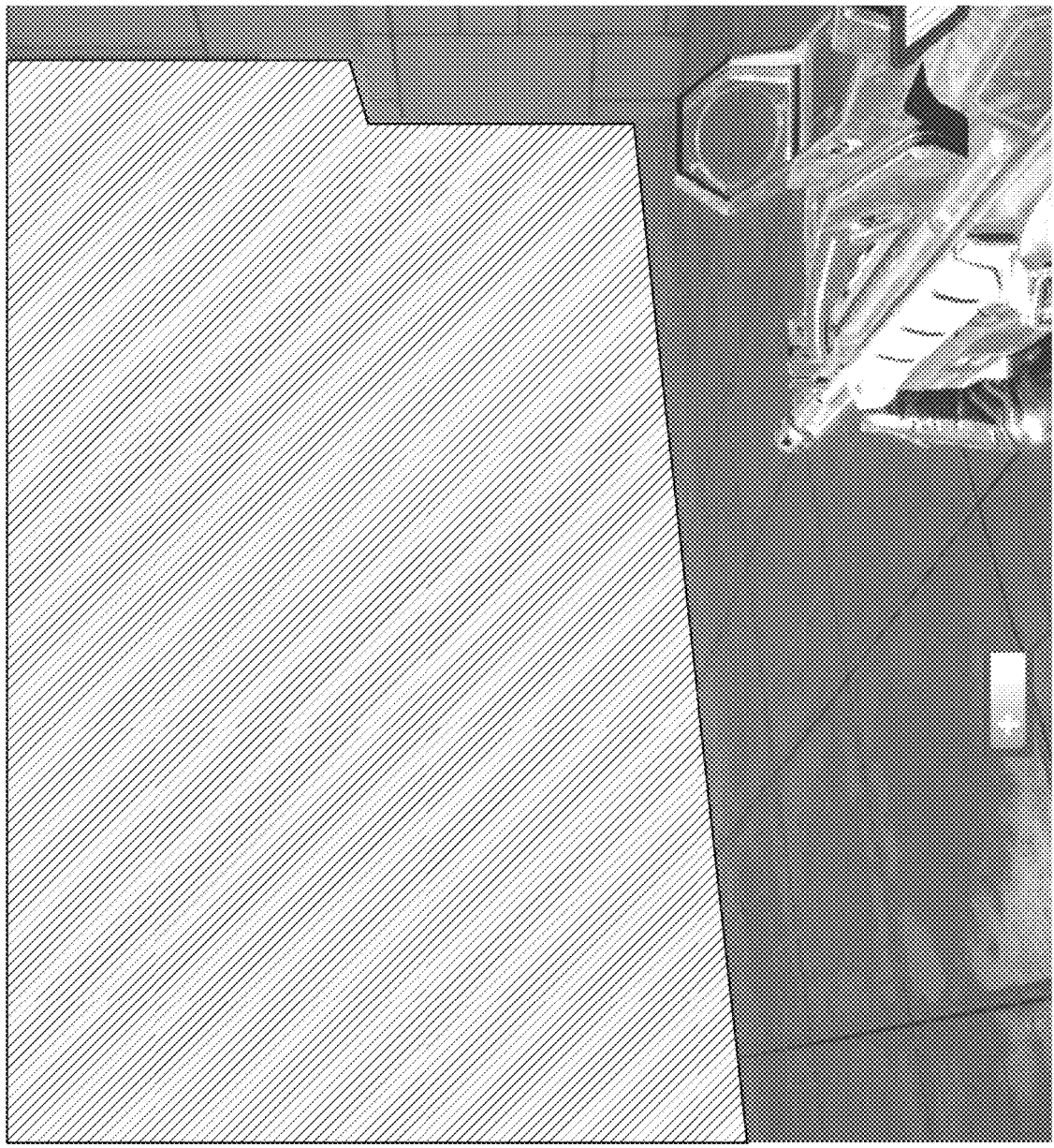

In another example, a player or viewer might have the option of displaying a 'death zone' option. The 'death zone' might appear as a shaded volume of space within the virtual environment (illustrated by a hatched area in FIG. 11), and represent the area within the map where most players are killed. During gameplay, the depth data stored in the depth video can be used to render the death zone so that it appears with the correct depth for the current view of the environment. This might be switched on by a spectator watching that player play the game (for example in e-sports).

Figure 12:
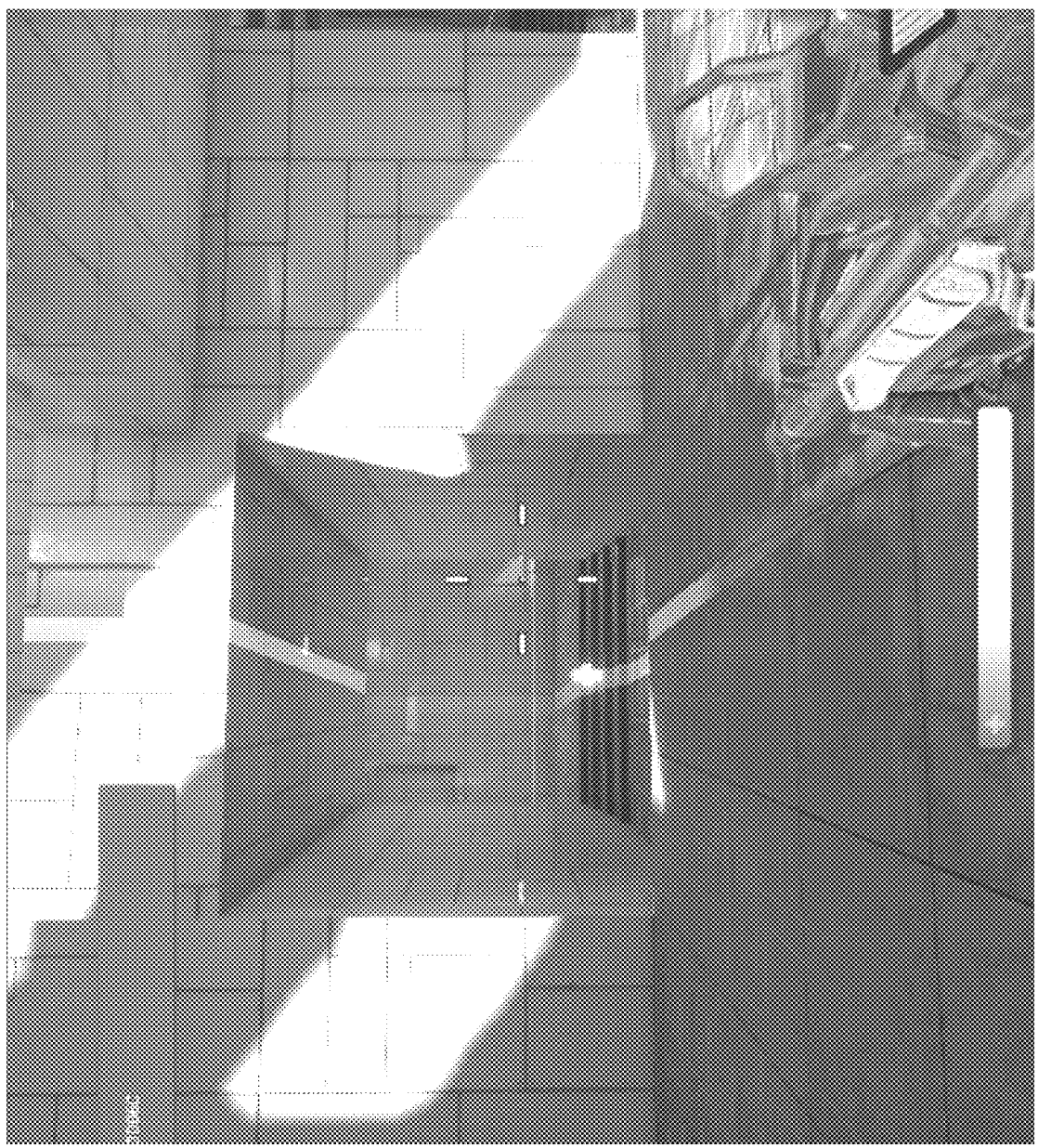

In another example, in a manner similar to that shown in relation to FIG. 7, the virtual object might be a path taken by successful players. In another example, the virtual objects could be an indicator indicating the position of e.g. enemies in the game. In yet another example, the virtual object could indicate the effective range of a weapon (seen in FIG. 12 as a colour-coded strip indicating weapon effectiveness into the distance). Spectators of e-sports might want to turn these on, for example, to see where the enemies where when a player was killed.

Hence it will be appreciated more generally that in principle whilst in-game events may be recorded during play for the purposes of augmenting the video, more generally game events and hence virtual objects or graphical effects may be associated with the recording after the recording has been generated (either offline or live), and treated in an identical fashion to in game events recorded during play as another possible augmentation data source or layer.

It will be appreciated therefore that a video viewer compatible with the parallel data sets of video, depth and camera position can calculate where to define an additional in game event (such as one of the comments, objects, or regions or other overlays noted above) within the recording, after the recording has been made and output by the original player, based on where a user chooses to place the game event within the current image; this x, y position in turn corresponds to a depth value (distance) from the camera viewpoint in the respective video image, thus allowing it to be defined with respect to the same reference point as the camera itself (e.g. in a similar manner to other in-game event data) within the associated data.

It will be appreciated that whilst reference is made herein to 'video recordings' and 'sequences of video images', these encompass both pre-recorded video (e.g. uploaded to a web-based host or streaming server) and also live video (again for example uploaded to a streaming server). In either case, the ability to augment the obtained footage is based on the combination of the video recording of the game footage and also the parallel recording of depth data and camera data.

Hence for example a streaming game service such as PS NOW® could output both colour video and depth encoding video, which could be used for rendering virtual objects within the live game. For example a second player on a local console could participate by augmenting and/or visually narrating the first player's experience.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The hardware for the video recording apparatus may thus be a conventional computing device such as a PlayStation 4 operating under suitable software instruction, comprising a recording processor (e.g. CPU 20A operating under suitable software instruction) adapted to record a first sequence of video image output by a videogame to a video storage means (e.g. HDD 37), the recording processor being adapted (e.g. by suitable software instruction) to record a sequence of depth buffer values for a depth buffer used by the videogame, the recording processor being adapted (e.g. by suitable software instruction) to record a sequence of in-game virtual camera positions used to generate the video images, and the recording processor being adapted (e.g. by suitable software instruction) to record one or more in-game events and their respective in-game positions; a video generating processor (e.g. CPU 20A again operating under suitable software instruction) adapted to generate a second sequence of video images encoding the depth buffer value sequence; and an association processor being adapted (e.g. by suitable software instruction) to associate the in-game virtual camera position sequence with at least one of the first and second sequence of video images. In each case, the suitable software instructions implement methods and techniques described herein as appropriate.

Similarly, the hardware for the video playback apparatus may be a conventional computing device such as a PlayStation 4 operating under suitable software instruction, comprising a playback processor (e.g. CPU 20A operating under suitable software instruction) adapted to obtain a first video recording of a videogame playing session, comprising a sequence of video images, the playback processor being adapted (e.g. by suitable software instruction) to obtain a second video recording generated by encoding a depth buffer value sequence, the playback processor being adapted to obtain an in-game virtual camera position sequence that is associated with at least one of the obtained video recordings; an analysis processor adapted (e.g. CPU 20A operating under suitable software instruction) to provide an in-game virtual camera position to an event analyser, the analysis processor being adapted (e.g. by suitable software instruction) to obtain data indicative of a statistically significant in-game event and an in-game event position; a position calculation processor (e.g. CPU 20A operating under suitable software instruction) adapted to calculate a position within a current video image of the first video recording corresponding to the in-game event position, in dependence upon the associated in-game virtual camera position and decoded depth buffer values; and an augmentation processor (e.g. CPU 20A and/or GPU 20B operating under suitable software instruction) adapted to augment the current video image with a graphical representation of the statistically significant in-game event, responsive to the calculated position. Again in each case, the suitable software instructions implement methods and techniques described herein as appropriate.

Finally likewise an event analyser may be a conventional computing device such as a server or a PlayStation 4 operating under suitable software instruction, comprising a receiver (e.g. Ethernet® port 32 operating in conjunction with CPU 20A under suitable software instruction) adapted to respectively receive, from a plurality of video recording apparatuses, a videogame identifier and one or more associated in-game events and their respective in-game positions; an analysis processor (e.g. CPU 20A operating under suitable software instruction) adapted to perform an analysis on one or more aspects of the in-game events associated with a videogame identifier, and their respective in-game positions, to identify statistically significant in-game events; the receiver being adapted to subsequently receive, from a video playback apparatus, a videogame identifier and at least one of an in-game virtual camera position and an in-game player position; a selection processor (e.g. CPU 20A operating under suitable software instruction) adapted to select one or more identified statistically significant in-game events associated with the received videogame identifier and having an in-game position within a predetermined distance of at least one received position; and a transmitter (e.g. Ethernet® port 32 operating in conjunction with CPU 20A under suitable software instruction) adapted to transmit data indicative of the in-game event and its in-game position to the video playback device. Again in each case, the suitable software instructions implement methods and techniques described herein as appropriate.

As noted previously, the video recording apparatus, video playback apparatus and event analyser may be three separate devices, or maybe two separate devices in any combination, or a single device comprising all three aspects.

Consequently a system (200) may comprise the video recording apparatus as described herein, and one or more of video playback apparatus and the event analyser either as separate devices or within a single device. In principle a system may similarly comprise the video playback apparatus as described herein together with the event analyser.

It will be appreciated that using the above techniques and apparatus, a facility is provided wherein users can record their own gameplay and upload it to publicly accessible hosts such as YouTube® and Twitch® (or potentially a proprietary host such as one belonging to the administrator of a network associated with a type of videogame console), and subsequently viewers of that video, using a device or application implementing as applicable the techniques described herein, can watch the video of the user playing the game that is augmented with information relating to how other players played the game, thereby creating a context for the users decisions, successes and failures within the game, and a more rich viewing experience.

As noted previously, whilst it is possible to record footage using the techniques described herein, or to simply record footage in a conventional fashion, it may be preferable to only record selective highlights, or to indicate within generally recorded footage where such corresponding selective highlights occur, so that in the case at playback optionally only such selective highlights may be shown to a user.

One criterion for a selective highlight is whether a particular target object of interest is visible within the game footage. The target object may be selected manually by a user, or may be selected automatically. For example, the target object may be a current boss in a game, or an opponent having a particular quality such as being the leader in the race, or having been most recently fired at by the player of the game, or may be a quest object that the user has to find. It will be apparent that any suitable target object may be selected, depending on the nature of the game and the current state of play.

Figure 13:
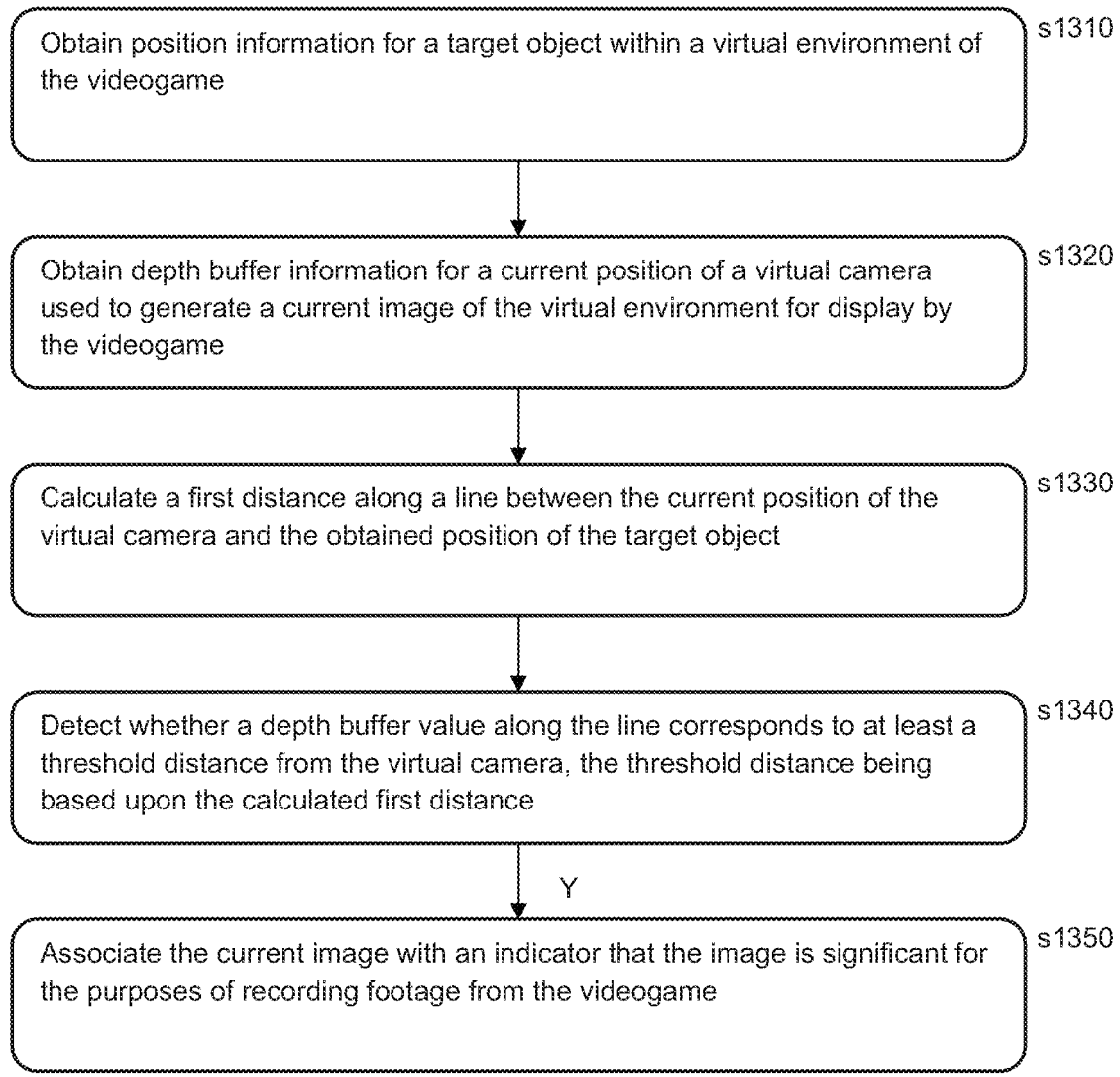
FIG. 13 is a flow diagram of a method of detecting significant footage for recording from a videogame, in accordance with embodiments of the present invention.

Given a target object, then referring now to FIG. 13, a method of detecting significant footage for recording from a videogame comprises:

In a first step s1310, obtaining position information for a target object within a virtual environment of the videogame. It will be appreciated that the videogame engine has position information for such objects, for example in an in-game coordinate system of the videogame in order to determine whether they are found and displayed within the virtual environment of the videogame. As will be described herein, this information may also be accessed from a recording.

In a second step s1320, obtaining depth buffer information for a current position of a virtual camera used to generate a current image of the virtual environment for display by the videogame. This information may be obtained directly by the videogame, or from footage of it that employs the techniques described herein.

In a third step s1330, calculating a first distance along a line between the current position of the virtual camera and the obtained position of the target object. Typically, both the position of the virtual camera and the position of the target object will be expressed within a common in-game coordinate system. A line of sight distance between the virtual camera position and the target object position may then for example be calculated by subtracting one position from the other and taking the absolute value.

In a fourth step s1340, detecting whether a depth buffer value along the line corresponds to at least a threshold distance from the virtual camera, the threshold distance being based upon the calculated first distance.

To a first approximation, the depth value itself can be compared directly with the distance. However, it will be appreciated that the depth values in an image can represent a planar distance on the z-axis. Therefore if the target object is not central in the video image, then whilst the line of sight distance between the camera position and the target object represents a hypotenuse of a right-angled triangle, by contrast the z-axis depth value may be equivalent to the length of the adjacent side of this triangle, and the offset of the target object from the optical centre of the virtual camera represents the opposite side of the triangle. Hence to a second approximation the line of sight distance compared to an equivalent hypotenuse for the depth value at the position within the image of the target object, or conversely the depth value can be compared to an equivalent adjacent length for the position within the image of the target object and the distance of the line of sight acting as a hypotenuse.

In either case, information from the depth buffer (e.g. depth value of the target object and optionally position of the target object in the image or depth buffer) is used to detect whether the depth value at the position of the target object is equivalent to the distance between the camera and the target object along a notional line of sight.

Figure 14A:
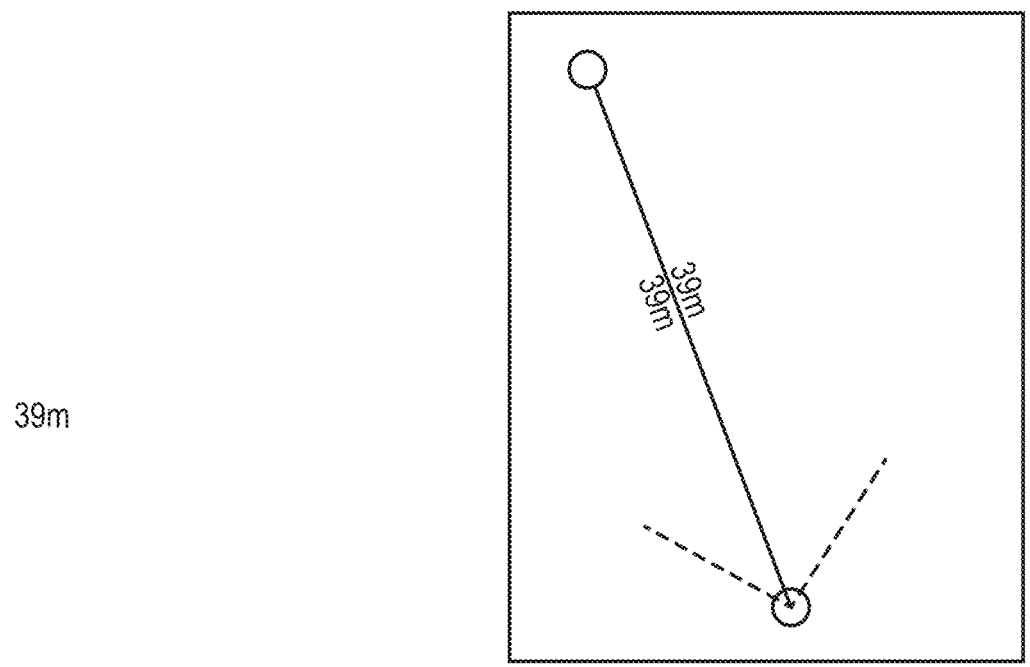
FIGS. 14A-C illustrate different scenarios for the evaluation of depth information, in accordance with embodiments of the present invention.

FIG. 14A shows a case where the depth is of equivalent distance to the line of sight between the camera and target object (in this case an example distance of 39 virtual metres within the game space), indicating that the target object is visible.

Figure 14B:
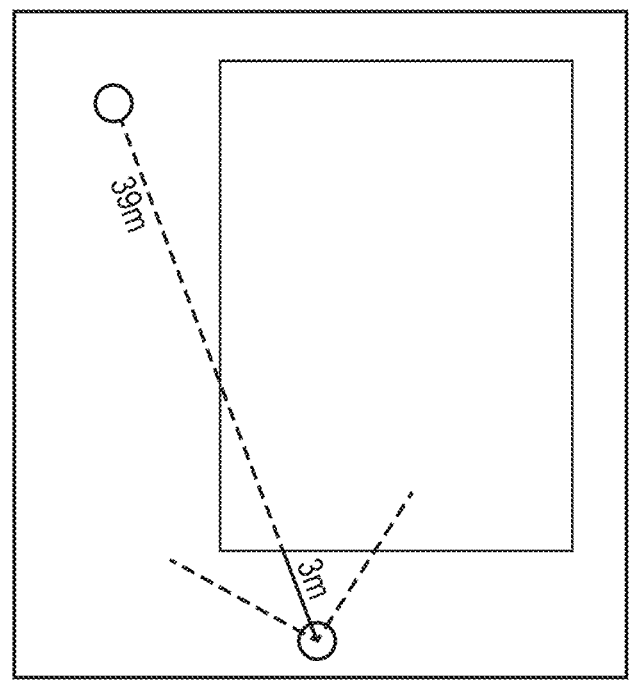

FIG. 14 B shows a case where the depth is significantly less than the equivalent distance to the line of sight between the camera and target object (in this case an example distance of 3 virtual metres within the game space, caused by the presence of a building indicated by the block in the figure), indicating that the target object is occluded and not visible.

The equivalence between the depth and the line of sight distance may be to within at least a threshold distance from the virtual camera (for example equivalent to the line of sight distance minus a predetermined amount), to accommodate that the depth buffer data may have a lower resolution in the z-axis than the internal representations of the video camera position and target object position, and/or to accommodate that the internal representation of the target object position may be a centre point of the target object, whereas a depth buffer may record the distance to the outer surface of the target object and hence be inherently shorter.

Notably, the target object may result in a plurality of equivalent distance values derived from multiple depth points associated with the object, because the object occupies multiple pixels on screen and hence has multiple corresponding depth values. Typically these are compared with the same notional line of sight distance, but alternatively different line of sight distances may be used for each pixel.

Hence in a case where target object is partially occluded by an object in front of it, only some parts of the target object may have distances similar (satisfying the threshold) to those of the notional line of sight distance. Optionally, in the fourth detection step, a target object may be detected as being visible only if all of the object has depth values that satisfy the threshold, or if only one depth value satisfies the threshold, or if a predetermined proportion of depth values satisfy the threshold, thereby enabling control over when a target object is considered sufficiently visible for the purposes of the video image being indicated as significant.

In any case, where a depth buffer value along the line does correspond to at least a threshold distance from the virtual camera, as detected in step four, then In a fifth step s1350, the current video image is associated with an indicator that the image is significant for the purposes of recording footage from the videogame. This indicator may be a flag incorporated into the video image, or meta data thereof, or where footage has been recorded using any of the techniques described herein, the indicator may be associated with the video image or with any other ancillary data associated with that video image, such as a parallel video image generated by encoding depth data and other data, in a similar manner to other ancillary data encoded using the techniques described herein.

Figure 14C:
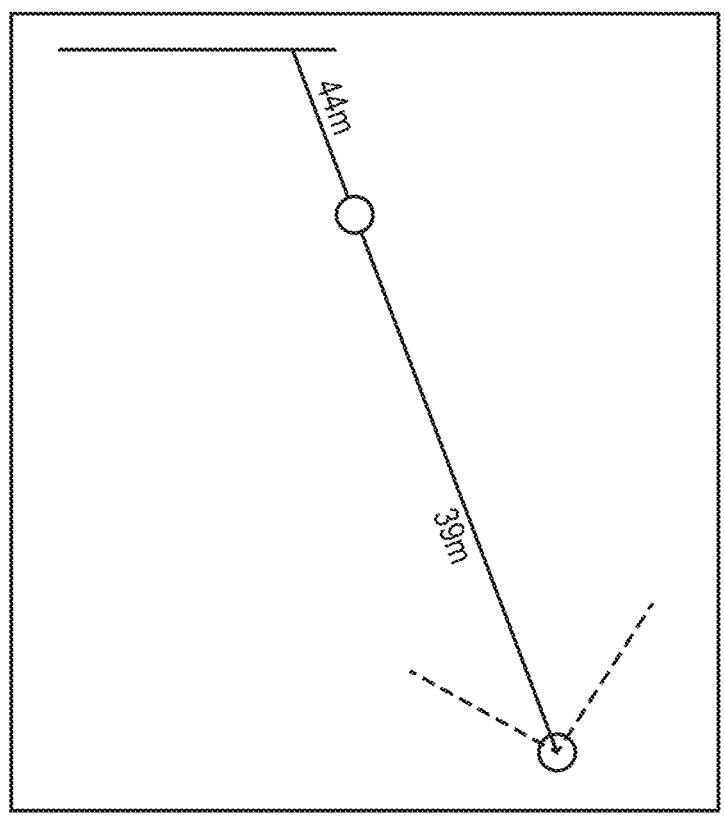

In the fourth step s1340, having a criterion that the effective distance is at least a threshold distance from the virtual camera allows for the possibility that the calculated equivalent distance based upon the depth data may be longer than the line of sight distance calculated between the internal representations of the virtual camera position and the target object. This allows the possibility that the line of sight passes through the virtual object for some reason, for example because there are gaps in the object (for example between an arm and a torso) or because of a transparency property of the object. Such a situation as illustrated in FIG. 14C. In such a case, because the object is known to be there and because the depth data is behind the object rather than in front of it (i.e. less than the threshold distance), then it can be assumed that the target object is at least partially visible within the image for the purposes of deciding to include an indicator.

In an embodiment of the present invention, the method further comprises the steps of recording a first video image output by the videogame, responsive to the video image being associated with an indicator that the image is significant for the purposes of recording footage from the videogame.

Hence the indicator may be used as a flag to trigger recording of the video image, for example to a video file or stream.

To contextualise this video image within broader gameplay, optionally the method comprises the step of recording a first sequence of video images output by the videogame, in which the first sequence of video images comprises a predetermined number of image frames proceeding a first video image in the sequence associated with an indicator that the image is significant for the purposes of recording footage from the videogame. This provides a run-up of predetermined length within the recorded videogame footage preceding the video image that has been indicated as significant.

To similarly contextualise this video image again optionally the method comprises the step of recording a first sequence of video images output by the videogame, in which the first sequence of video images comprises a predetermined number of image frames following a last video image in the sequence associated with an indicator that the image is significant for the purposes of recording footage from the videogame. This provides an aftermath of predetermined length within the recorded videogame footage following the video image that has been indicated a significant.

It will be appreciated that within a typical videogame session where for example the target object is an opponent, then an opponent may frequently go in and out of view during play (for example if the opponent ducks behind an object). It will be appreciated that using the above techniques, a plurality of images within the video sequence will be indicated as being significant (i.e. those actually showing some or all of the opponent), and these will be bracketed by a predetermined number of image frames proceeding and/or following those plurality of images.

Where the target object regularly appears and disappears, the preceding and following image frames may overlap, so as to provide a video sequence covering ongoing interactions with the target object. However, it is possible that during such on-line interactions, there are periods in which the target object is out of sight for longer than a combined period of the predetermined frames following the previous significant video frame and the number of frames proceeding the next significant video frame, resulting in a gap in footage. Hence optionally a further threshold number of frames (or equivalently, length of time) may be evaluated to determine whether the Between two separate significant video frames is less than a predetermined gap length that itself is greater than the combined period of following proceeding frames, and if so, then also include the frames within this gap. This approach allows for maintaining a smooth flow of coverage when views of the target object are intermittent but ongoing.

It will be appreciated that whilst the visibility of the target object may be considered sufficient to indicate that a video image is significant for the purposes of recording footage, optionally further criteria may be applied.

Hence embodiments of the present invention, the method comprises the step of detecting whether the video image is coincident, to within a predetermined threshold of time, with the occurrence one or more of a predetermined set of in-game events (for example, any events discussed previously herein, or any suitable event such as the death of a target object whose an opponent, the collection of the target object, the triggering of a particular animation, sound or behaviour associated with the target object, or the like). The predetermined threshold of time may be zero, or may be equivalent to the time represented by the predetermined frames, following frames or gap thresholds described previously, or any suitable time threshold. Furthermore, different time threshold may be used for different types of event, reflecting for example the duration of these respective events.

Subsequently, fifth step s1350 of associating the current image with an indicator that the image is significant is further conditional on whether the video image is detected as being coincident, to within a predetermined threshold of time, with the occurrence one or more of a predetermined set of in-game events.

As will be appreciated, this provides additional selectivity when associating an indicator with an image.

Optionally, instead of a mere binary flag, multiple levels of significance may be indicated using appropriate values, so that a first level simply indicates the presence of the target object, whilst a second level indicates the coincidence of that target object with an in game event. Recording or playback of video frames may then be made dependent on satisfying the first or second criteria, as appropriate (for example, a user may choose a first or second level of significance for recording or playback).

In another embodiment of the present invention, the method comprises the step of detecting whether the first distance does not exceed a cut-off threshold distance. This distance may be equivalent to a draw distance within the game, or may simply be equivalent to a distance at which the target object is less than a predetermined size. Notably this size may take account of the playback resolution of footage of the videogame when downloaded or streamed on a video service, where due to bandwidth or encoding conditions, the effective resolution of the image may be lower than that displayed during original gameplay. Hence the cut-off threshold distance may be selected according to a predetermined visual quality level or recognisability of the target object when viewed as an effective resolution typical of playback on a video streaming service chosen at the discretion of the designer.

Hence subsequently the step of associating the current image with an indicator that the image is significant may be made further conditional on whether the first distance does not exceed the threshold distance.

The above described techniques assume that the target object is within the field of view of the virtual camera, and hence has the potential to be on screen unless it is obscured by another object (resulting in the corresponding depth values being less than the threshold distance).

It may be valid to make this assumption, on the basis that the target object is only created as an in-game asset when potentially visible, but if this assumption is not valid, then optionally the method may comprise an initial step of detecting whether the target object is within the current field of view of the virtual camera, and if not, then bypassing the subsequent steps for the current image.

As was noted above, multiple depth values may be associated with the target object, because it occupies multiple pixels within the videogame image (or equally, occupies multiple pixels within a pre-rendered version of the environment created prior to z-culling).

In order to identify which depth values correspond to the target object, then optionally depth values may be isolated as representative of the target object by selecting a subset of the depth buffer within a threshold radius of the target object position (as provided by the game), and identifying one or more discontinuities in depth within this subset of the depth buffer to determine a boundary around the target object.

This is illustrated in FIGS. 15A-D.

Figure 15A:
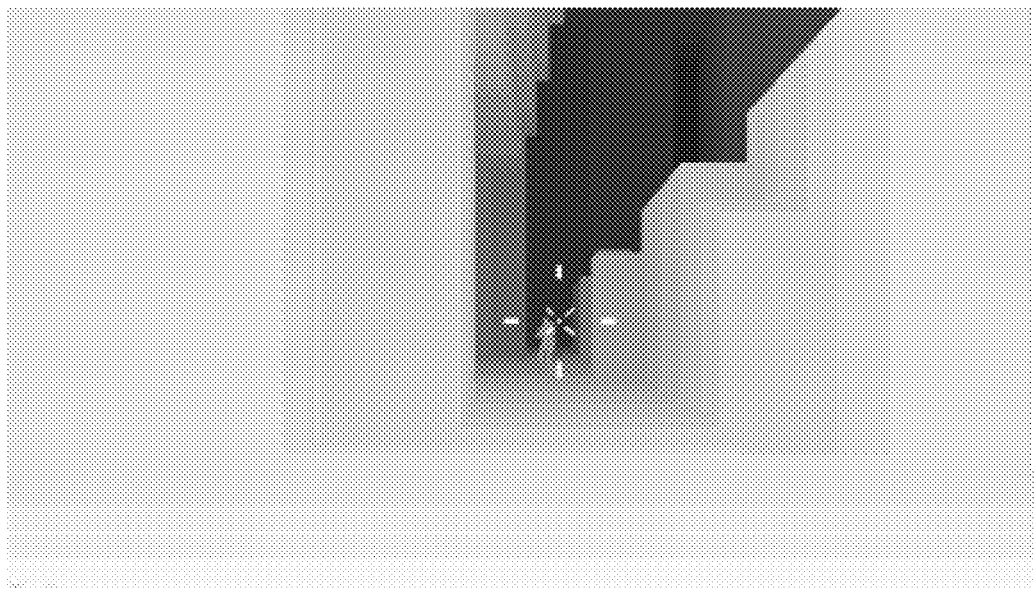
FIGS. 15A-D illustrate the isolation of a target object within a depth buffer, in accordance with embodiments of the present invention.

FIG. 15A illustrates the depth buffer for an example image, with values represented using greyscale, where darker shades indicate greater depth.

Figure 15B:
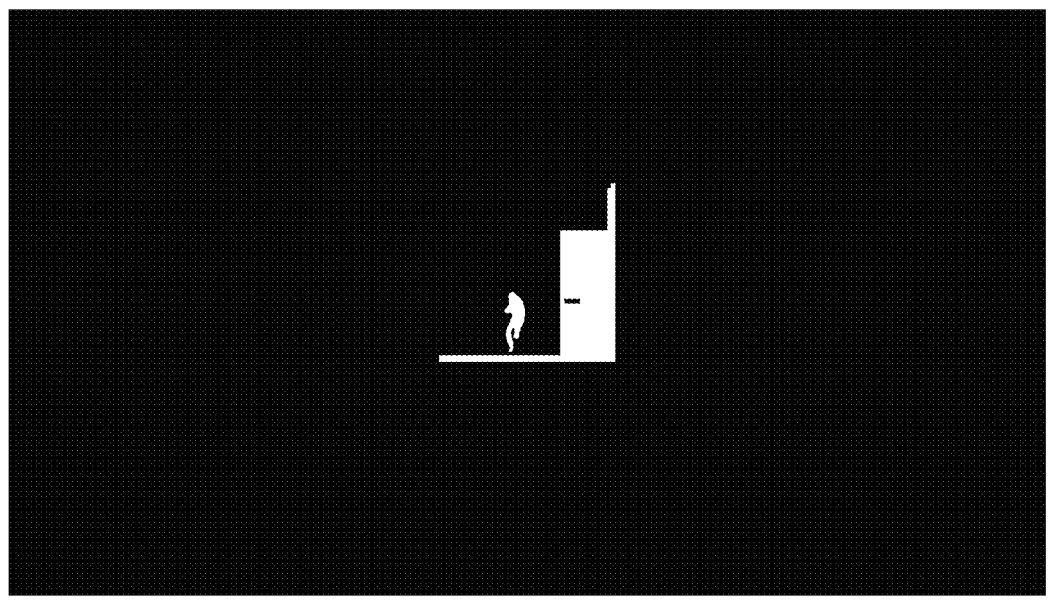

FIG. 15B illustrates a portion of the depth buffer within a radius of the indicated position of a target object (in this case a depiction of a soldier) obtained from the game.

Figure 15C:
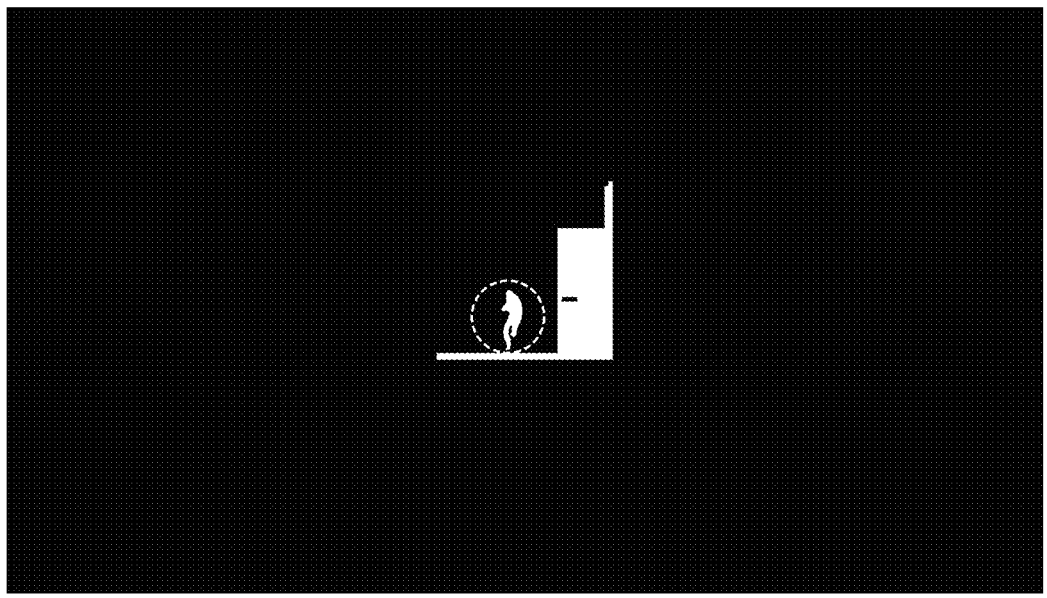

FIG. 15C shows a dashed circle indicating the portion of the depth buffer originating at the indicated position of the target object that has no discontinuities (for example, the gap between the soldier and the door is a discontinuity, because the depth values in between these two objects are much larger and fall outside the subset of the depth buffer).

Figure 15D:
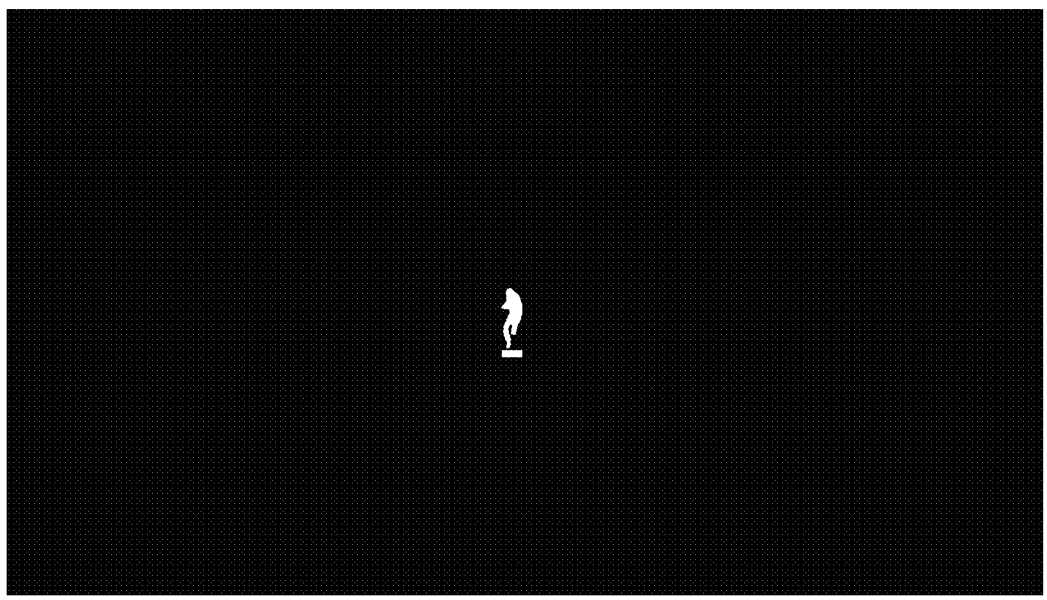

FIG. 15D shows the remaining portion of the depth buffer that both falls within the radius and has no discontinuities. This represents a good approximation of the target object as rendered (or pre-rendered).

Optionally, the threshold radius is with respect to a point of intersection between the target object and the line between the current position of the virtual camera and the obtained position of the target object. In other words, the radius is respect to a rough centre point of the object rather than with respect to the ground at the relevant distance.

The threshold radius itself may be calculated responsive to a notional size the target object within the virtual environment, combined with the line of sight distance to the object, to predict a threshold radius that will encompass the target object at its rendered or pre-rendered size.

It will be appreciated that this approach allows for variations in the current depiction of the target object that may be otherwise difficult to detect, such as changes caused by procedural animation, physics effects, changes to alpha values caused by lighting processes, and the like.

However, where the outline of the target object may be known using any other means (for example, where the target object is a sprite or uses predetermined animation frames, as may be the case for example in some platform games), then these alternative means may be used instead.

It will be appreciated, that the indicator of significance may be treated as ancillary data within a recording of footage of a videogame, using techniques described previously herein. Hence in an embodiment of the present invention, the method may comprise the steps of recording a first sequence of video images output by a videogame, comprising at least one video image detected as being significant for the purposes of recording footage from the videogame, recording a corresponding sequence of indicator values indicative of which video images are significant the purposes of recording footage from the videogame, recording a corresponding sequence of depth buffer values for a depth buffer used by the videogame, recording a corresponding sequence of in-game virtual camera positions used to generate the video images, generating a second sequence of video images encoding the depth buffer value sequence; and associating the sequence of indicator values with at least one of the first and second sequence of video images, using any of the techniques described herein.

As has been described above, the indicator of significance may be used to decide whether or not to record a video image, and optionally leading and lead out sequences of images on either side of the significant video image. However alternatively, video may be recorded unconditionally (or more generally, based upon conditions independent of the indicator of significance, such as event driven conditions, or user selection), but this video may then also include the indicators of significance, so that a playback system can selectively playback the video.

Figure 16:
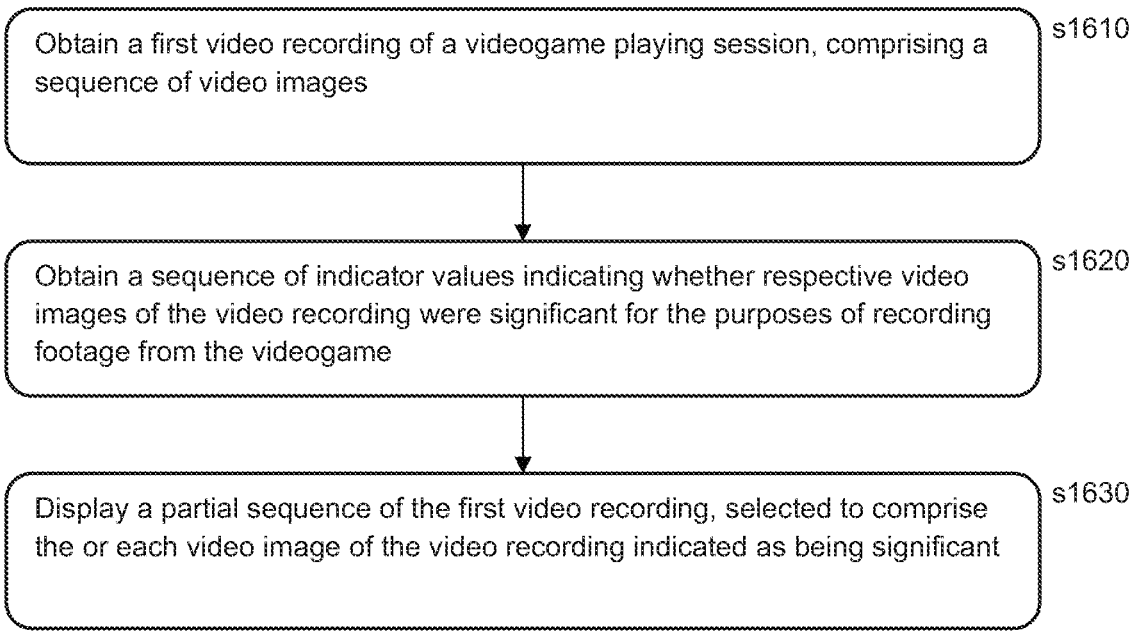
FIG. 16 is a flow diagram of a method of selective playback, in accordance with embodiments of the present invention.

Accordingly, referring to FIG. 16, in an embodiment of the present invention a method of selective playback comprises:

In a first step s1610, obtaining a first video recording of a videogame playing session, comprising a sequence of video images. These may be obtained using any of the techniques described herein as appropriate.

In a second step s1620, obtaining a sequence of indicator values indicating whether respective video images of the video recording were significant for the purposes of recording footage from the videogame. Again, these may be obtained using any of the techniques described herein as appropriate, for associated data. Hence for example the indicator values may be incorporated into the video images or metadata for those images, or may be included in a data file associated with the first video recording.

In a third step s1630, displaying a partial sequence of the first video recording, selected to comprise the or each video image of the video recording indicated as being significant. As described previously herein, this may optionally comprise preceding or following lengths of video to contextualise those indicated as being significant.

As indicated above, the sequence of indicator values may be associated with the video, having been previously computed by the entertainment device that recorded the video.

However alternatively in an embodiment of the present invention, the method of selective playback further comprises the steps of obtaining a second video recording generated by encoding a depth buffer value sequence, and obtaining data indicative of an in-game virtual camera position sequence that is associated with at least one of the obtained video recordings, and the sequence of indicator values are then obtained using steps s1310 to s1350 described previously herein, using data obtained from the first and second video recordings.

Hence will be appreciated that alternatively or in addition to the augmentation of playback described previously herein, playback can be made selective depending upon the significance of the video frames.

Furthermore be appreciated that as described previously, the significance can be made further dependent upon the temporal proximity of the appearance of a target object to a predetermined in game event, if such game event data is also associated with one of the first and second video recordings, as described elsewhere herein.

Hence the selective output of video footage based on the significance of video frames can be decided when the footage is recorded, either to control which frames to record, or to embed data indicating which frames to playback, or can be decided at playback, using relevant information recorded in association with the video footage of the game using any of the techniques described herein (in particular, depth data, camera position data, and target object position data).

Variants on the above schemes may include respective significance indicators for multiple target objects, so that a user can select which object(s) they consider significant during playback of a recording, and only few footage comprising the or each selected object, again optionally with contextual padding of the video. Similarly, whilst a target object for generating significant indicators may be selected by a user (for example by tagging an object in-game, or selecting object from a drop-down list within the game), or automatic selection of a target object may be implemented by game rules (for example, the leading race car, or the current opponent), optionally a designer may select successive target objects for different points within a game, or different target object may be selected according to a user's interaction with the game; for example different optional quests may have different associated target objects, and the current target object will depend upon the currently selected quest.

It will be appreciated that in similar manner to that described previously herein, the above techniques may be implemented on suitable hardware that has been adapted by suitable software instruction.

Hence hardware to implement the method of detecting significant footage for recording from a videogame may comprise an entertainment device adapted by suitable software instruction, and comprising a target processor (e.g. CPU 20A operating under suitable software instruction) configured to obtain position information for a target object within a virtual environment of the videogame; a depth processor (e.g. CPU 20A operating under suitable software instruction) configured to obtain depth buffer information for a current position of a virtual camera used to generate a current image of the virtual environment for display by the videogame; a distance processor (e.g. CPU 20A operating under suitable software instruction) configured to calculate a first distance along a line between the current position of the virtual camera and the obtained position of the target object; a correspondence processor (e.g. CPU 20A operating under suitable software instruction) configured to detect whether a depth buffer value along the line corresponds to at least a threshold distance from the virtual camera, the threshold distance being based upon the calculated first distance; and if so, an association processor (e.g. CPU 20A operating under suitable software instruction) is configured to associate the current image with an indicator that the image is significant for the purposes of recording footage from the videogame.

Similarly, hardware to implement a method of selective playback may comprise an entertainment device adapted by suitable software instruction, and comprising a first video input processor (e.g. CPU 20A operating under suitable software instruction) configured to obtain a first video recording of a videogame playing session, comprising a sequence of video images; an indicator value processor (e.g. CPU 20A operating under suitable software instruction) configured to obtain a sequence of indicator values indicating whether respective video images of the video recording were significant for the purposes of recording footage from the videogame; and a display processor (e.g. CPU 20A and/or GPU 2B operating under suitable software instruction) configured to display a partial sequence of the first video recording, selected to comprise the or each video image of the video recording indicated as being significant.

It will be apparent to a person skilled in the art that variations in the above hardware corresponding to operation of the various techniques of the methods as described and claimed herein are considered within the scope of the present invention, including but not limited to:

recording a first video image output by the videogame, responsive to the video image being associated with an indicator that the image is significant for the purposes of recording footage from the videogame;

recording a first sequence of video images output by the videogame, in which the first sequence of video images comprises a predetermined number of image frames proceeding a first video image in the sequence associated with an indicator that the image is significant for the purposes of recording footage from the videogame;

recording a first sequence of video images output by the videogame, in which the first sequence of video images comprises a predetermined number of image frames following a last video image in the sequence associated with an indicator that the image is significant for the purposes of recording footage from the videogame;

detecting whether the video image is coincident, to within a predetermined threshold of time, with the occurrence one or more of a predetermined set of in-game events, and the process of associating the current image with an indicator that the image is significant being made further conditional on whether the video image is detected as being coincident, to within a predetermined threshold of time, with the occurrence one or more of a predetermined set of in-game events;

detecting whether the first distance does not exceed a cut-off threshold distance, and the process of associating the current image with an indicator that the image is significant being made further conditional on whether the first distance does not exceed the threshold distance;

detecting whether the target object is within the current field of view of the virtual camera, and if not, then bypassing the subsequent steps for the current image;

selecting a subset of the depth buffer within a threshold radius of the target object position, and identifying one or more discontinuities in depth within this subset of the depth buffer to determine a boundary around the target object;

the threshold radius optionally being with respect to a point of intersection between the target object and the line between the current position of the virtual camera and the obtained position of the target object;

recording a first sequence of video images output by a videogame, comprising at least one video image detected as being significant for the purposes of recording footage from the videogame, recording a corresponding sequence of indicator values indicative of which video images are significant the purposes of recording footage from the videogame, recording a corresponding sequence of depth buffer values for a depth buffer used by the videogame, recording a corresponding sequence of in-game virtual camera positions used to generate the video images, generating a second sequence of video images encoding the depth buffer value sequence, and associating the sequence of indicator values with at least one of the first and second sequence of video images;

for playback, obtaining a sequence of indicator values from indicator data associated with the first video recording; and for playback, obtaining a second video recording generated by encoding a depth buffer value sequence, obtaining data indicative of an in-game virtual camera position sequence that is associated with at least one of the obtained video recordings, and obtaining the sequence of indicator values were by implementing the method outlined in steps s1310 to s1350.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of detecting significant footage for recording from a videogame, comprising the steps of:
   obtaining position information for a target object within a virtual environment of the videogame;
   obtaining depth buffer information for a current position of a virtual camera used to generate a current image of the virtual environment for display by the videogame;
   calculating a first distance along a line between the current position of the virtual camera and the obtained position of the target object;
   detecting whether a depth buffer value along the line corresponds to at least a threshold distance from the virtual camera, the threshold distance being based upon the calculated first distance;
   and if so, associating the current image with an indicator that the image is significant for the purposes of recording footage from the videogame.

2. A method according to claim 1, comprising the steps of:
   recording a first video image output by the videogame, responsive to
   the video image being associated with an indicator that the image is significant for the purposes of recording footage from the videogame.

3. A method according to claim 2, comprising the step of:
   recording a first sequence of video images output by the videogame, in which
   the first sequence of video images comprises a predetermined number of image frames proceeding a first video image in the sequence associated with an indicator that the image is significant for the purposes of recording footage from the videogame.

4. A method according to claim 2, comprising the step of:
   recording a first sequence of video images output by the videogame, in which
   the first sequence of video images comprises a predetermined number of image frames following a last video image in the sequence associated with an indicator that the image is significant for the purposes of recording footage from the videogame.

5. A method according to claim 1, comprising the step of:
   detecting whether the video image is coincident, to within a predetermined threshold of time, with the occurrence one or more of a predetermined set of in-game events;
   and in which
   the step of associating the current image with an indicator that the image is significant is further conditional on whether the video image is detected as being coincident, to within a predetermined threshold of time, with the occurrence one or more of a predetermined set of in-game events.

6. A method according to claim 1, comprising the step of:
   detecting whether the first distance does not exceed a cut-off threshold distance; and in which the step of associating the current image with an indicator that the image is significant is further conditional on whether the first distance does not exceed the threshold distance.

7. A method according to claim 1, comprising an initial step of: detecting whether the target object is within the current field of view of the virtual camera, and if not, then bypassing the subsequent steps for the current image.

8. A method according to claim 1, comprising the steps of:
   selecting a subset of the depth buffer within a threshold radius of the target object position;
   identifying one or more discontinuities in depth within this subset of the depth buffer to determine a boundary around the target object.

9. A method according to claim 8, in which the threshold radius is with respect to a point of intersection between the target object and the line between the current position of the virtual camera and the obtained position of the target object.

10. A method according to claim 1, comprising the steps of:
    recording a first sequence of video images output by a videogame, comprising at least one video image detected as being significant for the purposes of recording footage from the videogame;
    recording a corresponding sequence of indicator values indicative of which video images are significant the purposes of recording footage from the videogame;
    recording a corresponding sequence of depth buffer values for a depth buffer used by the videogame;
    recording a corresponding sequence of in-game virtual camera positions used to generate the video images;
    generating a second sequence of video images encoding the depth buffer value sequence; and
    associating the sequence of indicator values with at least one of the first and second sequence of video images.

11. A method of selective playback, comprising the steps of:
    obtaining a first video recording of a videogame playing session, comprising a sequence of video images;
    obtaining a sequence of indicator values indicating whether respective video images of the video recording were significant for the purposes of recording footage from the videogame;
    displaying a partial sequence of the first video recording, selected to comprise at least one of the video images of the video recording indicated as being significant; and
    obtaining a second video recording generated by encoding a depth buffer value sequence;
    obtaining data indicative of an in-game virtual camera position sequence that is associated with at least one of the obtained video recordings,
    wherein the sequence of indicator values are obtained by a method of detecting significant footage for recording from the videogame, comprising:
    obtaining position information for a target object within a virtual environment of the videogame;
    obtaining depth buffer information for a current position of a virtual camera used to generate a current image of the virtual environment for display by the videogame;
    calculating a first distance along a line between the current position of the virtual camera and the obtained position of the target object;
    detecting whether a depth buffer value along the line corresponds to at least a threshold distance from the virtual camera, the threshold distance being based upon the calculated first distance; and if so, associating the current image with an indicator that the image is significant for the purposes of recording footage from the videogame.

12. A non-transitory, computer readable medium having computer executable instructions stored thereon, which when executed by a computer system, cause the computer system to perform a method of selective playback, comprising the steps of:
    obtaining a first video recording of a videogame playing session, comprising a sequence of video images;

obtaining a sequence of indicator values indicating whether respective video images of the video recording were significant for the purposes of recording footage from the videogame;

displaying a partial sequence of the first video recording, selected to comprise at least one of the video images of the video recording indicated as being significant; and obtaining a second video recording generated by encoding a depth buffer value sequence;

obtaining data indicative of an in-game virtual camera position sequence that is associated with at least one of the obtained video recordings, wherein the sequence of indicator values are obtained by a method of detecting significant footage for recording from the videogame, comprising:

obtaining position information for a target object within a virtual environment of the videogame;

obtaining depth buffer information for a current position of a virtual camera used to generate a current image of the virtual environment for display by the videogame;

calculating a first distance along a line between the current position of the virtual camera and the obtained position of the target object;

detecting whether a depth buffer value along the line corresponds to at least a threshold distance from the virtual camera, the threshold distance being based upon the calculated first distance; and if so, associating the current image with an indicator that the image is significant for the purposes of recording footage from the videogame.

13. An entertainment device adapted to detect significant footage for recording from a videogame, the device comprising:

a target processor configured to obtain position information for a target object within a virtual environment of the videogame;

a depth processor configured to obtain depth buffer information for a current position of a virtual camera used to generate a current image of the virtual environment for display by the videogame;

a distance processor configured to calculate a first distance along a line between the current position of the virtual camera and the obtained position of the target object;

a correspondence processor configured to detect whether a depth buffer value along the line corresponds to at least a threshold distance from the virtual camera, the threshold distance being based upon the calculated first distance;

and if so, an association processor is configured to associate the current image with an indicator that the image is significant for the purposes of recording footage from the videogame.

14. An entertainment device adapted to selectively playback footage recorded from a videogame, the device comprising:

a first video input processor configured to obtain a first video recording of a videogame playing session, comprising a sequence of video images;

an indicator value processor configured to obtain a sequence of indicator values indicating whether respective video images of the video recording were significant for the purposes of recording footage from the videogame;

a display processor configured to display a partial sequence of the first video recording, selected to comprise at least one of the video images of the video recording indicated as being significant;

a second video input processor configured to obtain a second video recording generated by encoding a depth buffer value sequence;

a processor configured to obtain data indicative of an in-game virtual camera position sequence that is associated with at least one of the obtained video recordings, wherein the sequence of indicator values are obtained by a method of detecting significant footage for recording from the videogame, comprising:

obtaining position information for a target object within a virtual environment of the videogame;

obtaining depth buffer information for a current position of a virtual camera used to generate a current image of the virtual environment for display by the videogame;

calculating a first distance along a line between the current position of the virtual camera and the obtained position of the target object;

detecting whether a depth buffer value along the line corresponds to at least a threshold distance from the virtual camera, the threshold distance being based upon the calculated first distance; and if so, associating the current image with an indicator that the image is significant for the purposes of recording footage from the videogame.

* * * * *